United States Patent
Yoshikawa et al.

(10) Patent No.: US 7,042,212 B2
(45) Date of Patent: May 9, 2006

(54) ROTATIONAL ANGLE SENSORS

(75) Inventors: Koji Yoshikawa, Aichi-ken (JP); Tsutomu Ikeda, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/956,346

(22) Filed: Oct. 4, 2004

(65) Prior Publication Data

US 2005/0073299 A1    Apr. 7, 2005

(30) Foreign Application Priority Data

Oct. 2, 2003   (JP) .............................. 2003-344417
Oct. 2, 2003   (JP) .............................. 2003-344420

(51) Int. Cl.
*G01B 7/30*   (2006.01)

(52) U.S. Cl. ................................. 324/207.25

(58) Field of Classification Search ................ 324/173, 324/174, 207.11–207.19, 207.2, 207.21, 207.25, 324/243, 244, 260–262; 123/612, 617; 361/720–722, 361/760–761

See application file for complete search history.

(56) References Cited

U.S. PATENT DOCUMENTS 6,324,745 B1 * 12/2001 Poag et al. .................... 29/598
2005/0116706 A1 * 6/2005 Keane .................... 324/207.25

FOREIGN PATENT DOCUMENTS

JP   6 264777   9/1994
JP   2003 057071   2/2003

* cited by examiner

*Primary Examiner*—Bot Ledynh
(74) *Attorney, Agent, or Firm*—Dennison, Schultz, Dougherty & MacDonald

(57) ABSTRACT

A rotational angle sensor detects a rotational angle of a rotary member based on a magnet field produced across the rotary member by a pair of magnets. At least one magnetic detection device is disposed within a holder and serves to detect the magnetic field and to output a signal representing the rotational angle of the rotary member. For example, the holder may be mounted to a fixed place. A printed circuit board is coupled to the holder and is electrically connected to the at least one magnetic detection device. A positioning device serves to position the at least one magnetic detection device in a predetermine position relative to the holder.

23 Claims, 14 Drawing Sheets

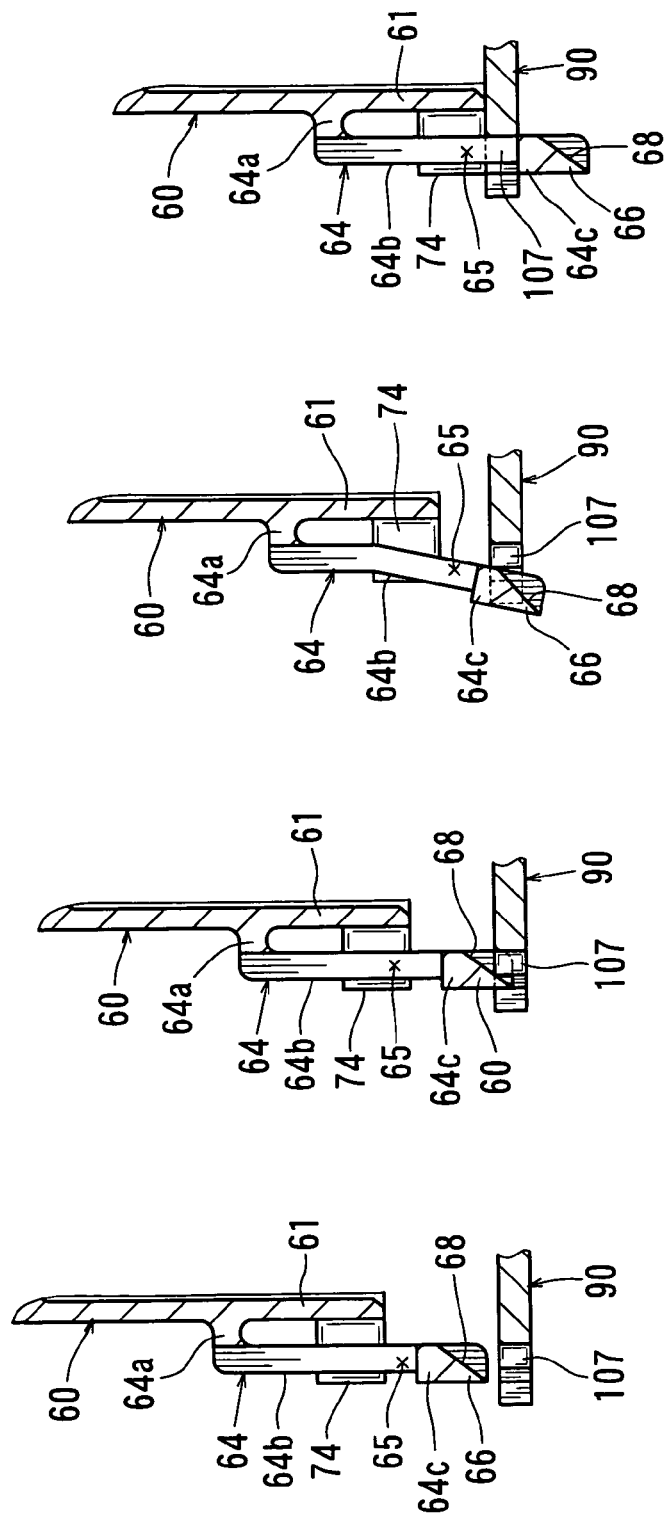

ROTATIONAL ANGLE SENSORS

This application claims priority to Japanese patent application serial numbers 2003-344417 and 2003-344420, the contents of which are incorporated herein by reference.

BACKGROUND OF THE INVENTION

1. Field of the Invention

The present invention relates to rotational angle sensors for detecting the rotational angle of rotary members.

2. Description of the Related Art

Throttle control devices have been used for electronically controlling the flow rate of intake air supplied into an engine, such as an internal combustion engine of an automobile. Some of the throttle control devices have rotational angle sensors that serve as throttle sensors for detecting the rotational angle of a motor shaft of a motor driving a throttle valve. For example, Japanese Laid-Open Patent Publication No. 6-264777 teaches such a rotational angle sensor.

Various types of rotational angle sensors are known to be used for throttle control devices. For example, Japanese Laid-Open Patent Publication No. 2003-57071 teaches a rotational angle sensor that has a magnetic detection device and a printed circuit board. The magnetic detection device includes a pair of magnets disposed in opposing relation to each other with respect to a rotary member (i.e., on either side of a rotary member). The rotational angle of the rotary member is detected based upon a magnetic field produced between the magnets. More specifically, the detection device has a detection element that detects the density of the magnetic flux (i.e., the intensity of the magnetic field) produced between the magnets. The detection device then outputs detection signals representing the detected rotational angle. The detection device typically has connecting terminals that are electrically connected to the printed circuit board.

In order to facilitate the handling of the rotational angle sensor of a type disclosed in Japanese Laid-Open Patent Publication No. 2003-57071, the magnetic detection device may be disposed within a holder and the printed circuit board may be attached to the holder. The holder may then be mounted to a fixed place. However, in a situation where such a holder is incorporated, there has been a problem that in some cases the detection accuracy cannot be ensured.

SUMMARY OF THE INVENTION

It is accordingly an object of the present invention to teach improved rotational angle detection sensors that can accurately detect a rotational angle of a rotary member.

According to one aspect of the present teachings, rotational angle sensors are taught that detect a rotational angle of a rotary member based upon a magnet field produced across the rotary member by a pair of magnets. At least one magnetic detection device is disposed within a holder and serves to detect the magnetic field. The detection device then outputs a signal representing the rotational angle of the rotary member. The holder may be mounted to a location fixed with respect to the rotary member. For example, the location may be a cover or a body used to rotatably support the rotary member. A printed circuit board is coupled to the holder and is electrically connected to the at least one magnetic detection device. A positioning device serves to position the at least one magnetic detection device in a predetermine position relative to the holder.

The magnetic detection device(s) can therefore be reliably and accurately positioned in a desired configuration relative to the holder. As a result, the magnetic detection device(s) can output a signal that consistently represents the rotational angle. This aids in ensuring the detection accuracy of the rotational angle.

In another aspect of the present teachings, the rotational angle sensor includes a plurality of magnetic detection devices that are constrained by the positioning device.

In another aspect of the present teachings, the at least one magnetic detection device has a sensing section for detecting the magnetic field. The positioning device includes a projection formed on the sensing section and a corresponding positioning recess formed in the holder for interfacing with the projection. Therefore, by engaging the projection with the positioning recess the detection device can be easily and accurately positioned relative to the holder.

In another aspect of the present teachings, the holder has a generally rectangular tubular portion having a central axis. The rectangular tubular portion has a closed first end and an open second end. The positioning recess is formed in an inner wall of the rectangular tubular portion. The positioning device further includes a tapered recess continuously formed with the positioning recess, opening at the open second end of the rectangular tubular portion. The tapered recess has a width gradually increasing toward the open second end of the rectangular tubular portion, so that the tapered recess provides a guide for the projection in order to facilitate the ready engagement of the projection with the positioning recess.

The projection can be reliably engaged with the positioning recess even if the projection has not been accurately aligned before engagement with the positioning recess. As a result, the operation for engaging the projection with the positioning recess can be easily performed.

Preferably, a pair of projections is formed on the sensing section on opposite sides of the sensing section. Also preferably, a corresponding pair of positioning recesses connected to a pair of tapered recesses is formed on opposite sides of the inner wall of the rectangular tubular portion. With this arrangement, the detection device(s) can be more accurately positioned relative to the holder.

In another aspect of the present teachings, the positioning device further includes a resin material poured into the holder, so that the sensing section is embedded in resin. The position of the sensing section can then be securely maintained. In addition, the sensing section can be protected against some cases of external force or moisture.

In another aspect of the present teachings, before curing the resin is potted into the holder without applying a substantial pressure to the resin. Since no substantial pressure is applied to the sensing section, there is no substantial resulting distortion of the sensing section.

In another aspect of the present teachings, rotational angle sensors are taught that include a first detection device and a second detection device, each having connecting terminals for electrically connecting to a printed circuit board. The connecting terminals of the first magnetic detection device are positioned symmetrically with the connecting terminals of the second magnetic detection device.

A wiring pattern on the printed circuit board may be formed to have connecting points, such as through holes, arranged to correspond to the symmetrical arrangement of the connecting portions of the first and second magnetic detection devices. As a result, the wiring pattern may be designed to have a relatively simple configuration without parts containing cross over wiring. The manufacturing costs of the rotational angle sensor can then be lowered, and the detection accuracy of the rotational angle sensor can be improved.

In another aspect of the present teachings, the printed circuit board includes a wiring pattern formed on one side of the printed circuit board and a ground line formed on the other side. This allows the design of the wiring pattern to be further simplified.

In another aspect of the present teachings, the first magnetic detection device and the second magnetic detection device have substantially the same configuration with each other. In other words, the basic construction of the first magnetic detection device is the same as with the second magnetic detection device. The first and second magnetic detection devices may be different from each other in some minor details, such as the length of the connecting terminals. In addition, the connecting terminals of the first magnetic detection device may be positioned symmetrically to the connecting terminals of the second magnetic detection device about a point.

In another aspect of the present teachings, the holder has a rectangular tubular portion having a central axis. The point of symmetry for the connecting terminals of the first and second magnetic detection device is positioned on the central axis of the rectangular tubular portion.

In other aspect of the present teachings, the printed circuit board has a first group of through holes for connecting with the corresponding connecting terminals of the first magnetic detection device. The printed circuit board also has a second group of through holes for connecting with the corresponding connecting terminals of the second magnetic detection device. The first group of through holes is arranged symmetrically to the second group of through holes about the same point of symmetry as the connecting terminals.

In another aspect of the present teachings, the connecting terminals of the first magnetic detection device are positioned symmetrically to the connecting terminals of the second magnetic detection device about a line. For example, the line may pass through the central axis of the rectangular tubular portion.

In another aspect of the present teachings, the first group of through holes is arranged symmetrically to the second group of through holes about the same line as the connecting terminals.

In another aspect of the present teachings, the ground line formed on the printed circuit board also serves as a shield for protecting the at least one detection device against possible interference and electrical noises. By using the ground line as a shield, the printed circuit board can be further simplified and the manufacturing costs of the rotational angle sensor can be further reduced.

BRIEF DESCRIPTION OF THE DRAWINGS

FIGS. 13(a), 13(b), 13(c), and 13(d), are explanatory sectional views illustrating the operation of a snap-fit mechanism and respectively showing the state before the operation, the state where an engaging projection contacts with an engaging piece, the state where the engaging piece has been resiliently deformed, and the state where the operation has been completed.

DETAILED DESCRIPTION OF THE INVENTION

Each of the additional features and teachings disclosed above and below may be utilized separately or in conjunction with other features and teachings to provide improved rotational angle sensors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

A first representative embodiment will now be described with reference to FIG. 1 to FIGS. 13(a), 13(b), and 13(c). The first representative embodiment relates to a rotational angle sensor used as a throttle sensor of a throttle control device. The rotational angle sensor is used for detecting the rotational angle of the throttle shaft of a throttle valve as will be hereinafter described.

Figure 1:
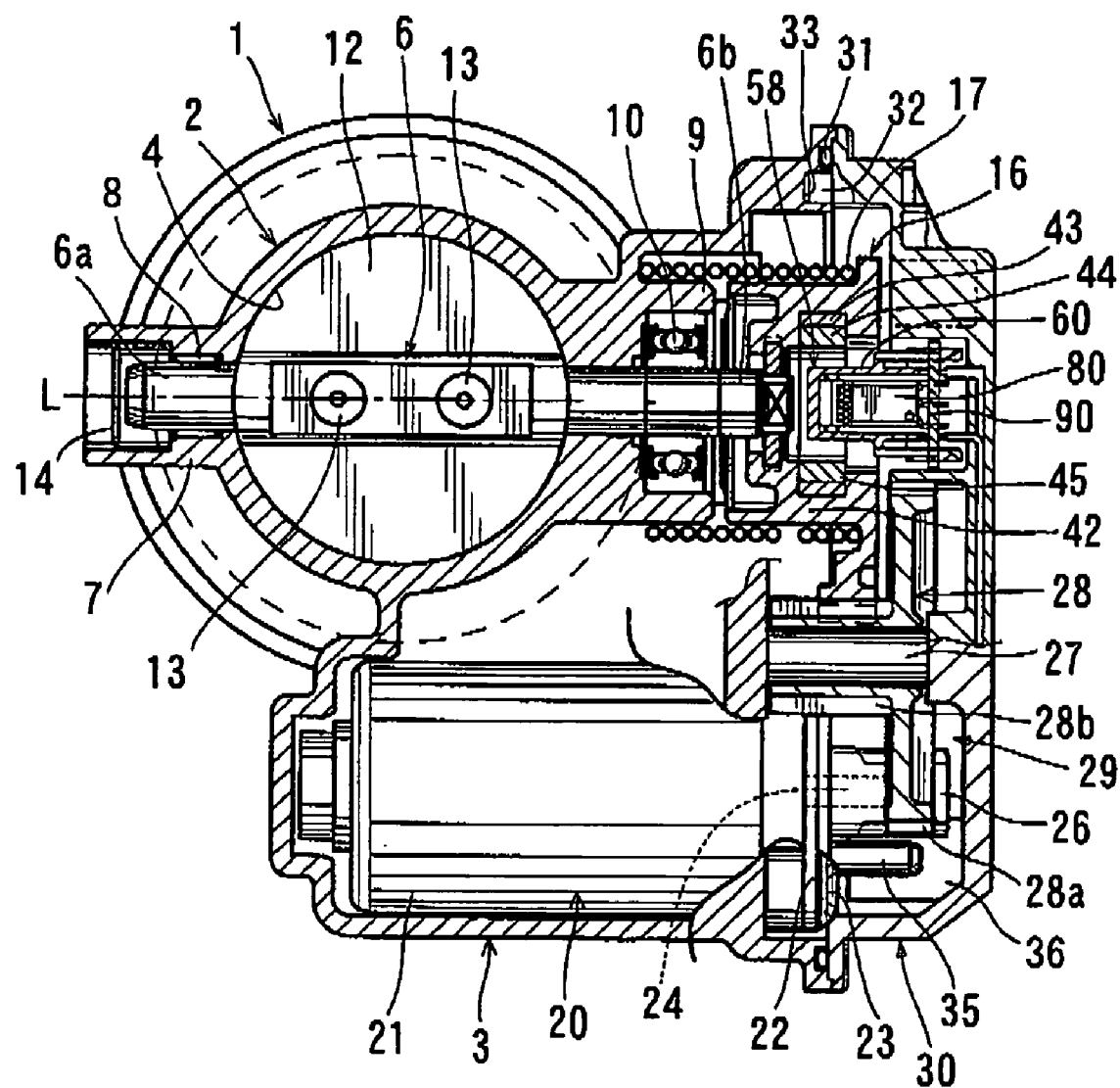
FIG. 1 is a horizontal sectional view of a throttle control device according to a first representative embodiment.

The general construction of the throttle control device will be first described. As shown in FIG. 1, the throttle control device has a throttle body 1 that may be made of resin. The throttle body 1 includes a bore wall portion 2 and a motor receiving portion 3 that are integrated with each other. A substantially cylindrical intake air channel 4 is formed in the bore wall portion 2 and extends orthogonal to the plane of the drawing as viewed in FIG. 1. Although not shown in the drawings, an air cleaner and an intake manifold may be connected to an upstream side and a downstream side of the bore wall portion 2.

A throttle shaft 6 made of metal is mounted within the bore wall portion 2 and extends across the intake air channel 4 in a diametrical direction. A support portion 7 of the bore wall portion 2 rotatably supports a first end 6a (the left end as viewed in FIG. 1) of the throttle shaft 6 via a bearing 8. The bearing 8 may be a thrust bearing. A support portion 9 of the bore wall portion 2 rotatably supports a second end 6b (the right end as viewed in FIG. 1) via a bearing 10. The bearing 10 may be a ball bearing. The support portions 7 and 9 are formed integrally with the bore wall portion 2.

A throttle valve 12 is secured to the throttle shaft 6 via rivets 13, so that the throttle valve 12 opens and closes the intake air channel 4 as the throttle shaft 6 rotates. As will be described later in more detail, a motor 20 rotates the throttle valve 12 via the throttle shaft 6 in order to control the flow of air through the intake air channel.

A plug 14 is fitted into the support portion 7 in order to seal the first end 6a of the throttle shaft 6 from the outside environment. The second end 6b of the throttle shaft 6 extends through and beyond the support portion 9. A throttle gear 16, configured as a sector gear, is non-rotatably mounted on the second end 6b. The throttle gear 16 may be made of resin. A return spring 17 is interposed between the throttle body 1 and the throttle gear 16. The return spring 17 serves to normally bias the throttle gear 16 in a closing direction of the throttle valve 12. Although not shown in the drawings, a stopper is provided for stopping the movement of the throttle valve 12 at a predetermined fully closed position.

The motor receiving portion 3 has a substantially cylindrical tubular configuration with a longitudinal axis substantially parallel to the rotational axis L of the throttle shaft 6. The motor receiving portion 3 has a closed left end and an open right end (as viewed in FIG. 1). The motor 20 is received within the motor receiving portion 3. The motor 20 has a motor casing 21 that defines the outer contour of the motor 20. A flange 22 is formed on the motor casing 21 and is secured to the throttle body 1 via a fastening device such as screws 23 (only one screw 23 is shown in the drawings).

The motor 20 has an output shaft 24 that extends rightward from the motor 20 as viewed in FIG. 1. A motor pinion 26 is mounted on the output shaft 24. The motor pinion 26 may be made of resin. A counter shaft 27 is mounted on the throttle body 1 and extends parallel to the rotational axis L of the throttle shaft 6. A counter gear 28 is rotatably supported on the counter shaft 27. The counter gear 28 may also be made of resin. The counter gear 28 has a large gear portion 28a and a small gear portion 28b. The large gear portion 28a engages the motor pinion 26 and the small gear portion 28b engages the throttle gear 16. In this way, the throttle gear 16, the motor pinion 26, and the counter gear 28, constitutes a speed reduction gear mechanism.

One side (the right side as viewed in FIG. 1) of the throttle body 1 is open to the outside. A cover 30 is joined to the throttle body 1 in order to close the open side of the throttle body 1, so that the reduction gear mechanism and other associated elements are prevented from being exposed to the outside environment. An O-ring 31 is disposed between opposing end surfaces of the throttle body 1 and the cover 30 in order to provide a hermetic seal therebetween. Pins 32 (only one pin 32 is shown in the drawings) extend from the end surface of the cover 30 and are fitted into corresponding receiving holes 33 formed in the end surface of the throttle body 1. Due to insertion of the pins 32 into the corresponding receiving holes 33, the cover 30 can be reliably positioned relative to the throttle body 1.

Figure 2:
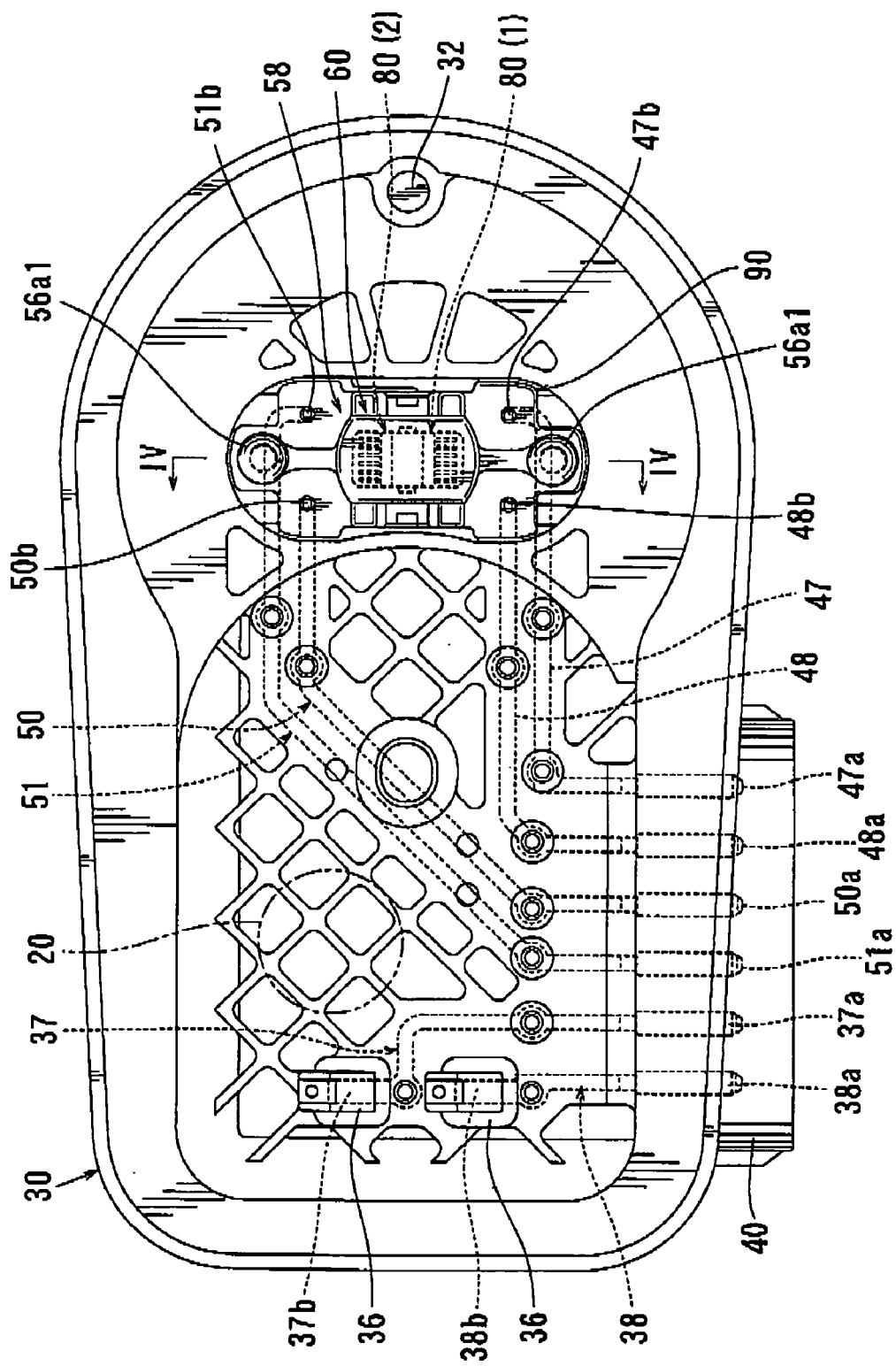
FIG. 2 is a view of a cover of the throttle control device as viewed from the interior side (as assembled) of the cover.
Figure 3:
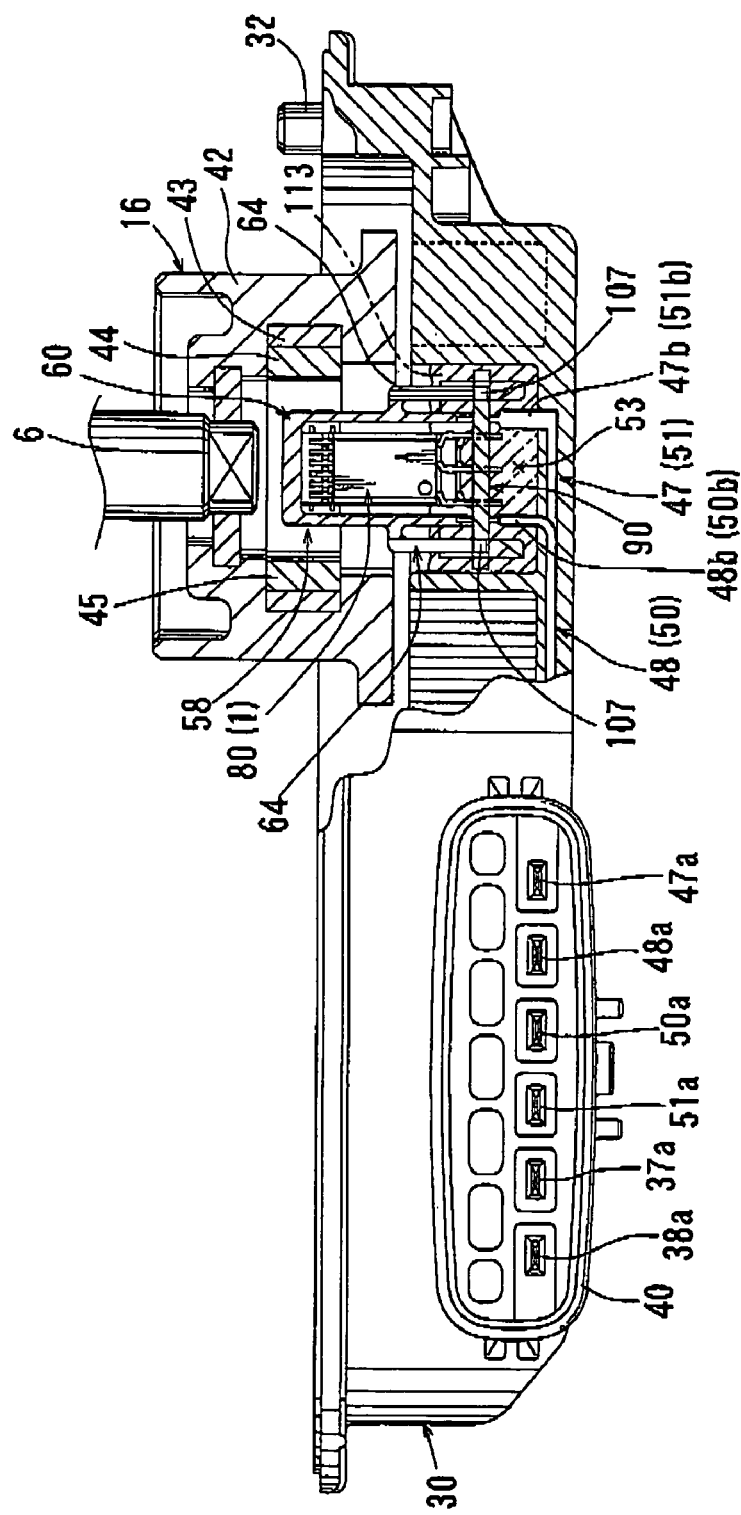
FIG. 3 is a bottom view of the cover with a section broken away.

The motor 20 has two motor terminals 35 (only one motor terminal 35 is shown in the drawings) that are connected to respective relay terminals 36 mounted to the cover 30. As shown in FIG. 2, one of the relay terminals 36 is connected to one end of a first motor connecting terminal 37 that is embedded into the cover 30 by an insertion molding process. The other of the relay terminals 36 is connected to one end of a second motor connecting terminal 38 that is also embedded into the cover 30 by the insertion molding process. The other end of the motor connecting terminal 37 is configured as an external connecting end 37a and extends downwardly (as viewed in FIG. 2) into a connector section 40. In addition, the other end of the motor connecting terminal 38 is configured as an external connecting end 38a and also extends downwardly into the connector section 40. As shown in FIG. 3, the connector section 40 is disposed on the lower portion of the cover 30 and has a substantially rectangular tubular configuration. An external multiple connector (not shown) can be connected to the connector section 40 in order to electrically connect the external connecting ends 37a and 38a to respective terminal pins (not shown) of the external multiple connector.

The external multiple connector is connected to an ECU (electronic control unit) (not shown) of the automobile, so that the motor 20 can be controlled by the ECU in response to accelerator signals representing the amount of depression of an accelerator pedal, traction control signals, constant-speed signals, and idling speed control signals, etc. The ECU controlled driving force of the motor 20 is transmitted to the throttle valve 12 via the motor pinion 26, the counter gear 28, the throttle gear 16 and the throttle shaft 6 in order to open or close the throttle valve 12.

As shown in FIG. 3, the throttle gear 16 has a substantially cylindrical tubular portion 42 that is mounted on the second end 6b of the throttle shaft 6. The tubular portion 42 has a central axis coincident with the rotational axis L of the throttle shaft 6 and extends toward the cover 30 beyond the second end 6b of the throttle shaft 6. A ring-shaped yoke 43, made of magnetic material, is embedded into the inner circumferential wall of the tubular portion 42 by an insertion molding process. The ring-shaped yoke 43 also has a central axis coincident with the rotational axis L of the throttle shaft 6.

A pair of permanent magnets 44 and 45 is integrally attached to the inner circumferential wall of the yoke 43 at the same time that the yoke 43 is integrated with the tubular portion 42 by the insertion molding process. The magnets 44 and 45 are ferritic magnets having arc-shaped configurations so as to extend along the inner circumferential wall of the yoke 43, as indicated by the double dashed chain lines in FIG. 7(a). In addition, the magnets 44 and 45 are positioned symmetrically to each other with respect to the rotational axis L of the throttle shaft 6. Further, as shown in FIG. 3, the yoke 43 and the magnets 44 and 45 are embedded into the tubular portion 42 such that both ends of each of the magnets 44 and 45 are not exposed to the outside. Only the inner peripheral surfaces of the magnets are exposed to the outside. The inner peripheral surfaces of the magnets may also extend flush with the inner circumferential wall of the tubular portion 42.

The magnets 44 and 45 are magnetized such that magnetic field lines produced therebetween extend substantially parallel to each other. In other words, a substantially uniform magnetic field is produced along a symmetrical plane of the magnets 44 and 45. Consequently, substantially parallel magnetic lines extend within the space defined by the yoke 43. The ferritic magnets incorporated as the magnets 44 and 45 in this representative embodiment are softer and higher in toughness than rare-earth magnets. The ferritic magnets can therefore be easily formed so as to have arc-shaped configurations. In addition, the ferritic magnets are generally more economical than the rare-earth magnets.

The cover 30 will now be described more in detail. As shown in FIG. 2, an output terminal 47 for a V1 signal, a signal input terminal 48 for a Vc signal, an output terminal 50 for a V2 signal, and an earth (E2) terminal 51, are embedded into the cover 30 via an insertion molding process. The motor-side terminals 37 and 38 also are embedded into the cover 30 by the same insertion molding process. The terminals 47, 48, 50, and 51 have respective connecting ends 47b, 48b, 50b and 51b (see FIGS. 5 and 6) that can be fitted into corresponding through holes 98, 99, 96, and 97 formed in an outer peripheral portion of a printed circuit board 90 (see FIGS. 11(a) and 11(c)).

As shown in FIG. 2, the terminals 47, 48, 50, and 51 have respective external connecting ends 47a, 48a, 50a, and 51a on the side opposite to the connecting ends 47b, 48b, 50b, and 51b. The external connecting ends 47a, 48a, 50a, and 51a extend downwardly into the connector section 40 of the cover 30 (see FIG. 3). Also, the external connecting ends 47a, 48a, 50a, and 51a, can be electrically connected to corresponding terminal pins of an external multiple connector (not shown) that is attached to the connecting section 40. As shown in FIG. 3, within the connector section 40, the external connecting ends 47a, 48a, 50a, and 51a of the terminals 47, 48, 50, and 51, and the external connecting ends 37a and 38a of the motor-side terminals 37 and 38, are arranged in a row in this order (in a right-to-left direction in FIG. 2) at predetermined intervals. As shown in FIG. 2, among the terminals 47, 48, 50 and 51, the terminal 47 for the V1 signal is located the furthest from the motor 20 (indicated by double dashed chain lines in FIG. 2). Therefore, even if the motor 20 generates electrical noises or interference, the influence of the electrical noises or interference upon the V1 signal outputted from the terminal 47 can be reduced or minimized.

Figure 4:
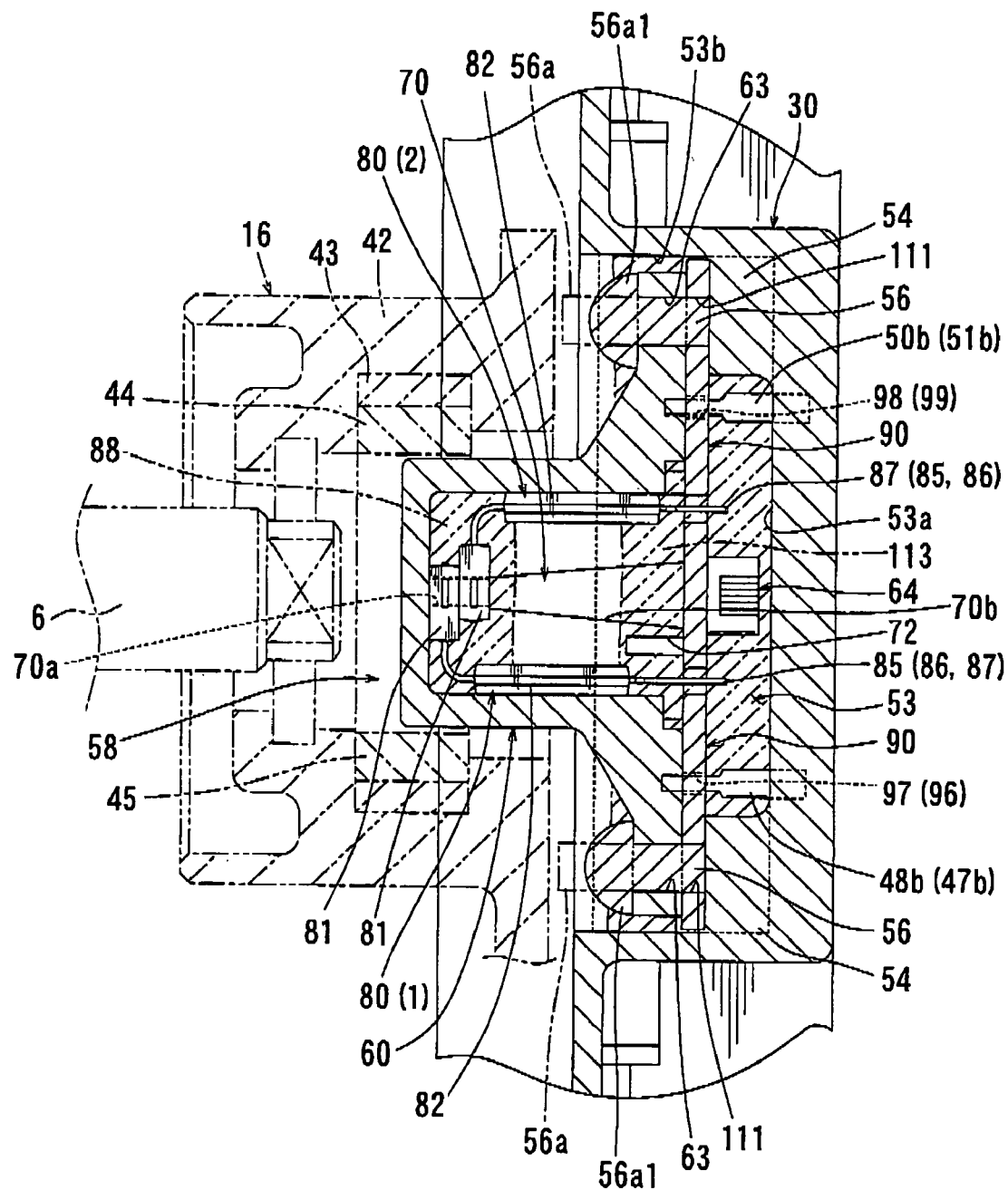
FIG. 4 is a cross sectional view taken along the line IV—IV in FIG. 2.
Figure 5:
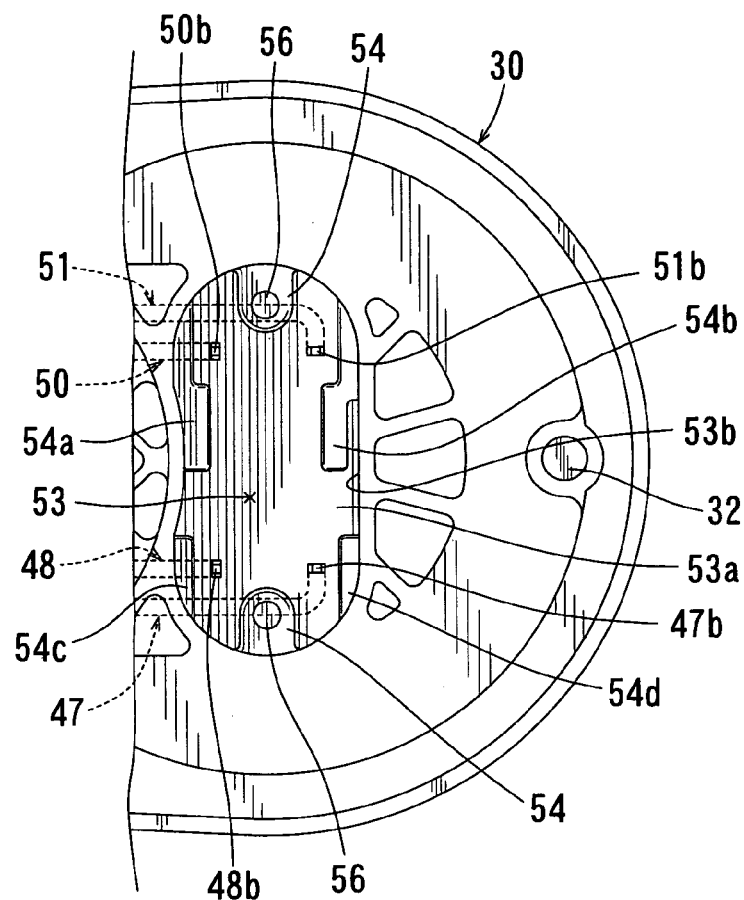
FIG. 5 is a view showing the inside of a major part of the cover.
Figure 6:
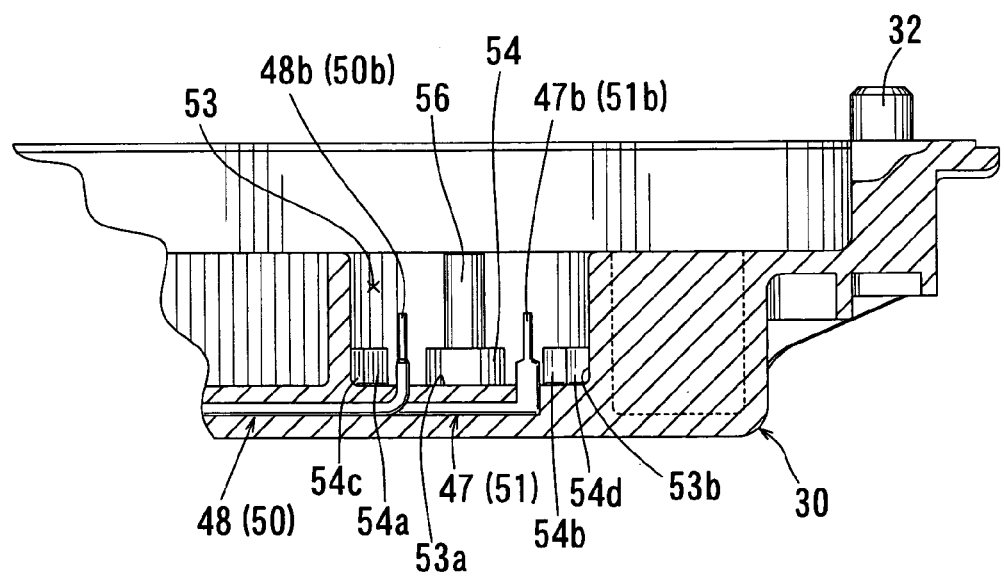
FIG. 6 is a sectional view of a part of the cover.

As shown in FIG. 4, a recess 53 is formed in the inner wall of the cover 30 in a position corresponding to the location of a rotational angle sensor 58 that will be explained later. As shown in FIGS. 5 and 6, the connecting ends 47b, 48b, 50b, and 51b of the terminals 47, 48, 50, and 51, extend from a bottom wall 53a of the recess 53 into the space defined by the recess 53. A circumferential wall 53b of the recess 53 is configured so as to engagingly receive the printed circuit board 90. In addition, a pair of mounts 54 and four support projections 54a, 54b, 54c, and 54d, are formed in continuity with the circumferential wall 53b. The mounts 54 oppose each other in the vertical direction as viewed in FIG. 5. The support projections 54a, 54b, 54c, and 54d, are respectively positioned on the upper left side, the upper right side, the lower left side and the lower right side of the recess 53. As shown in FIG. 6, the mounts 54 and the support projections 54a to 54d have substantially the same height as one another.

As shown in FIGS. 4 and 5, a positioning pin 56 extends into the space of the recess 53 from each of the mounts 54 (to the left in FIG. 4).

Figure 8:
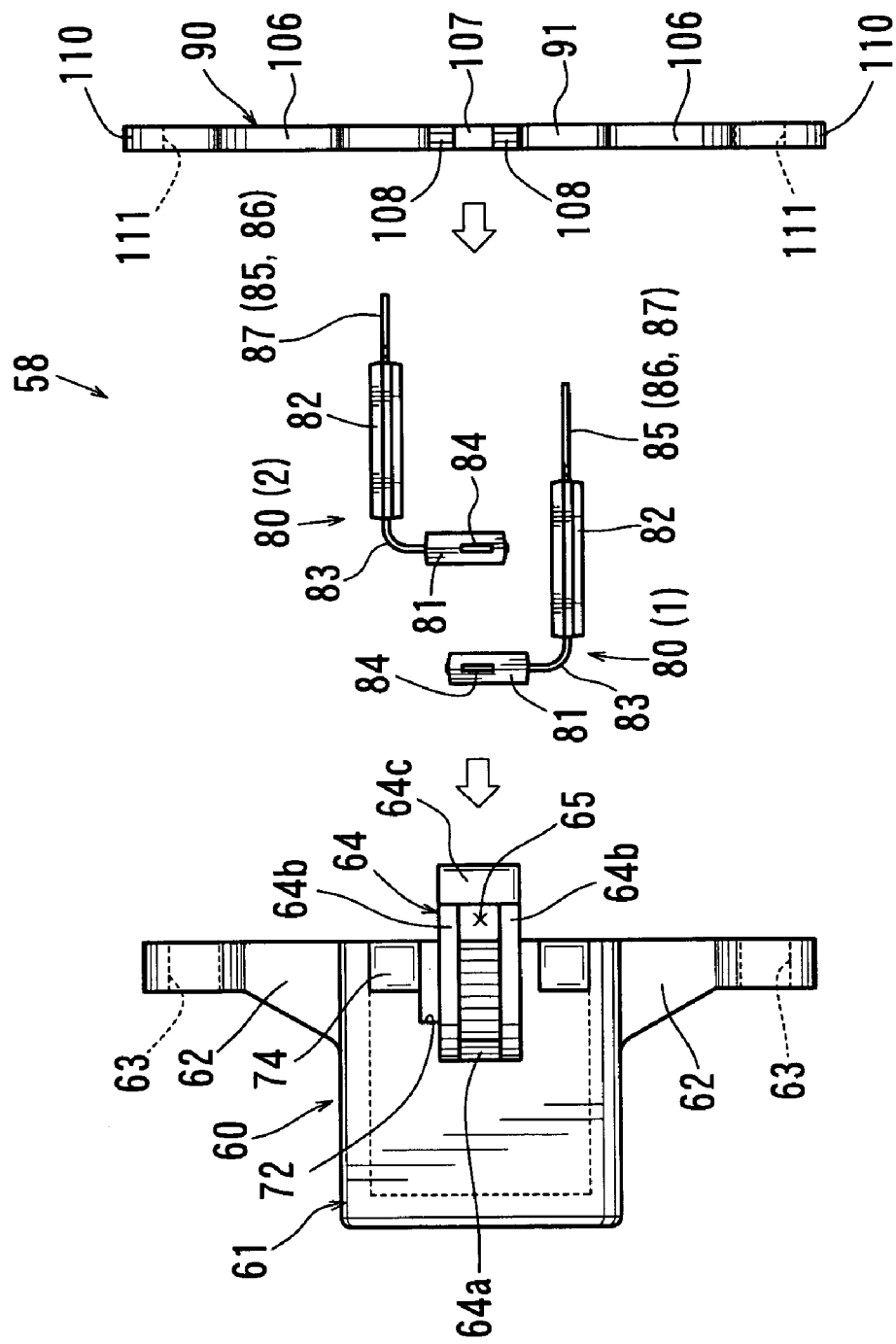
FIG. 8 is an exploded side view of the rotational angle sensor.

As shown in FIGS. 3 and 4, the rotational angle sensor 58 is fitted into the recess 53 of the cover 30. As shown in FIG. 8, the rotational angle sensor 58 has a holder 60, two sensor Ics, 80(1) and 80(2), and the printed circuit board 90.

As shown in FIGS. 9(a), 9(b), 9(c), 9(d), 9(e), and 9(f), which respectively show a front view, a cross sectional side view, a rear view, a bottom view, a cross sectional bottom view, and a perspective view from the rear side of the holder 60, a large percentage of the holder 60 is made up of a rectangular tubular portion 61. Preferably, the holder 60 may be made of resin. The rectangular tubular portion 61 has a substantially rectangular cross sectional configuration and includes a closed front end and an open rear end (see FIGS. 9(b) and 9(e)). As shown in FIGS. 9(a) to 9(c), a pair of mount pieces 62 is formed integrally with the rectangular tubular portion 61 and extends radially outwardly from opposite sides of the rectangular tubular portion 61 in the vertical direction. As shown in FIGS. 9(b) and 9(f), a positioning hole 63, configured as a through-hole, is formed in each of the mount pieces 62.

A pair of engaging pieces 64 is formed integrally with the rectangular tubular portion 61 on opposite sides of the rectangular tubular portion 61 (the right and left directions as viewed in FIG. 9(a)). Each of the engaging pieces 64 has a base portion 64a extending radially outward from the rectangular tubular portion 61, a pair of parallel arms 64b extending from both sides of the base portion 64 in a downward direction as viewed in FIG. 9(d), and joint 64c extending between the lower ends of the parallel arms 64b. As shown in FIG. 9(e), a downwardly elongated engaging hole 65 is defined by the base 64a, the arms 64b, and the joint 64c. The engaging pieces 64, in particular their arms 64b, can be resiliently deformed so as to flex as indicated by dashed chain lines in FIG. 9(d). The joint 64c of each engaging piece 64 is located in a position downwardly apart from the open end of the rectangular tubular portion 61. The joint 64c has a thickness greater than the arms 64b. Consequently, a part of the joint 64 extends outwardly from the arms 64b by a predetermined distance.

The joint 64c has a pair of guide projections 66 that extend parallel to each other in line with the corresponding arms 64b. The distance between the guide projections 66 is the same as the distance between the arms 64b.

As shown in FIG. 9(e), the joint 64c further includes a slide guide surface 68 defined between the guide projections 66. The guide surface 68 is inclined relative to the vertical direction as viewed in FIG. 9(e) and extends from the outer lower end to the inner upper end of the joint 64c.

Figure 9:
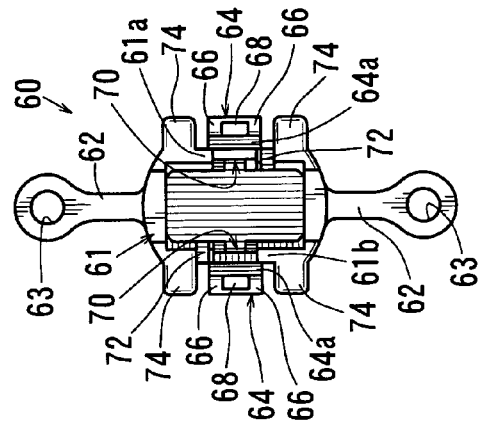
FIGS. 9(a), 9(b), 9(c), 9(d), 9(e), and 9(f), are respectively, a front view, a side sectional view, a rear view, a bottom view, a broken-away bottom view, and a perspective view as viewed from the rear side, of a holder.
Figure 9:
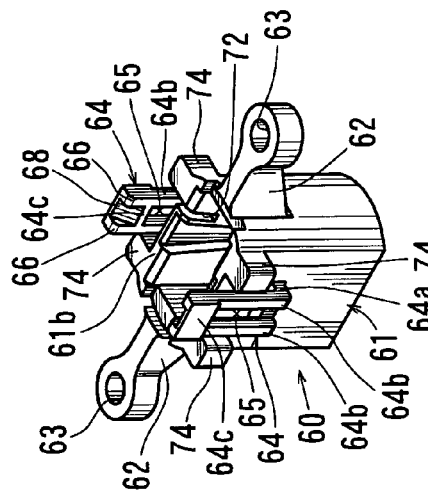
Figure 9:
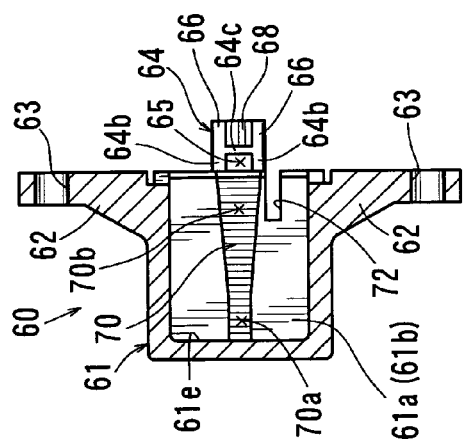
Figure 9:
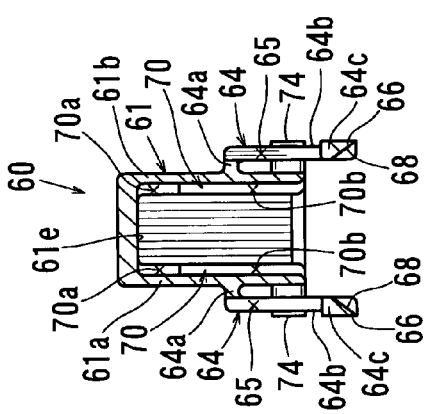
Figure 9:
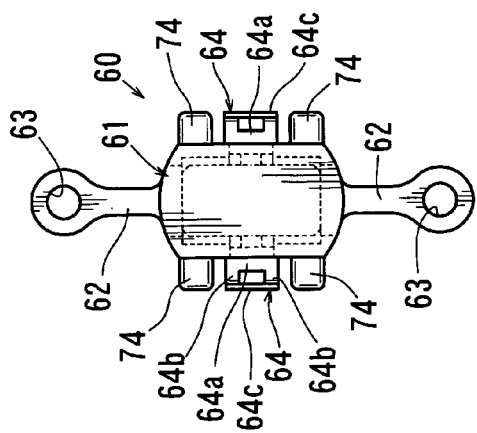
Figure 9:
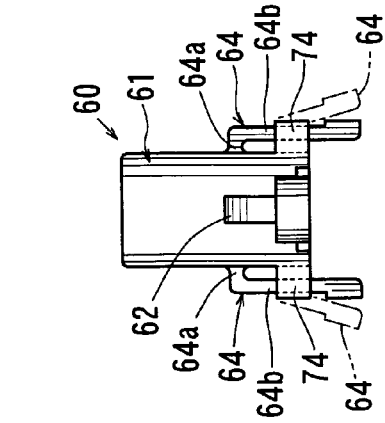

As shown in FIG. 9(b), a guide recess 70 is formed in the central portion of each of opposing right and left sidewalls 61a and 61b of the rectangular tubular portion 61. The guide recess 70 extends in the forward and rearward directions (the right and left directions as viewed in FIG. 9(b)). The region of the guide recess 70 in the vicinity of an inner bottom surface 61e of the rectangular tubular portion 61 is defined as the positioning recess portion 70a. The positioning recess portion 70a has a width (in the vertical direction as viewed in FIG. 9(b)) in order to engagingly receive a corresponding one of the projections 84 formed on the left and right sides of a sensing section 81 of each sensor IC, 80(1) and 80(2) (see FIG. 10(a)). In addition, the guide recess 70 has a tapered recess portion 70b that becomes narrower in width in the vertical direction (as viewed in FIG. 9(b)) towards the positioning recess portion 70a from the open end of the rectangular tubular portion 61. The positioning recess portion 70*a* serves to determine the position of the sensing section 81 of each sensor IC, 80(1) and 80(2), as will be hereinafter described. Further, as shown in FIG. 9(*c*), cut-out recesses 72 are formed in the end portions of the right and left sidewalls, 61*a* and 61*b*, defining the open end of the rectangular tubular portion 61. The recesses 72 are positioned adjacent to the respective guide recesses 70. More specifically, the cut-out recesses 72 are positioned symmetrically with each other with respect to the central longitudinal axis of the rectangular tubular portion 61. Furthermore, a pair of shifting movement prevention extensions 74 is formed on the outer side of each of the right and left sidewalls 61*a* and 61*b* so as to be positioned symmetrically to one another. Each engaging piece 64 is positioned between the extensions 74.

Figure 10:
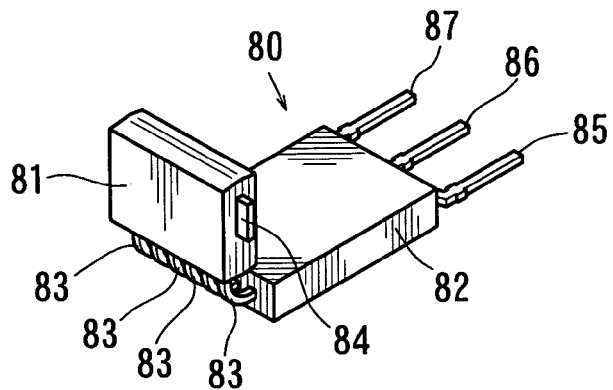
FIGS. 10(a), 10(b), and 10(c), are respectively, a perspective view, a side view, and a plan view of one of the sensor ICs.
Figure 10:
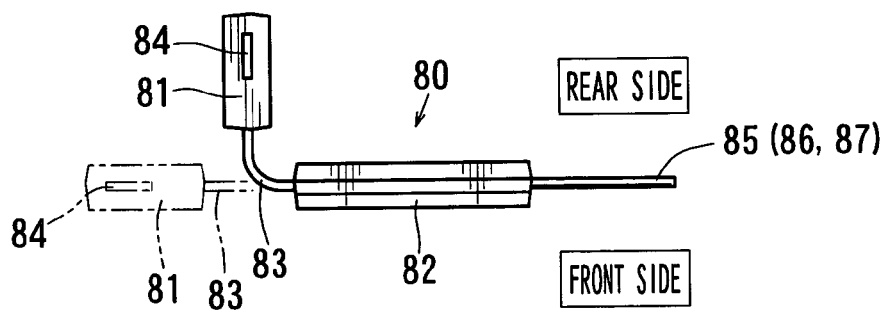
Figure 10:
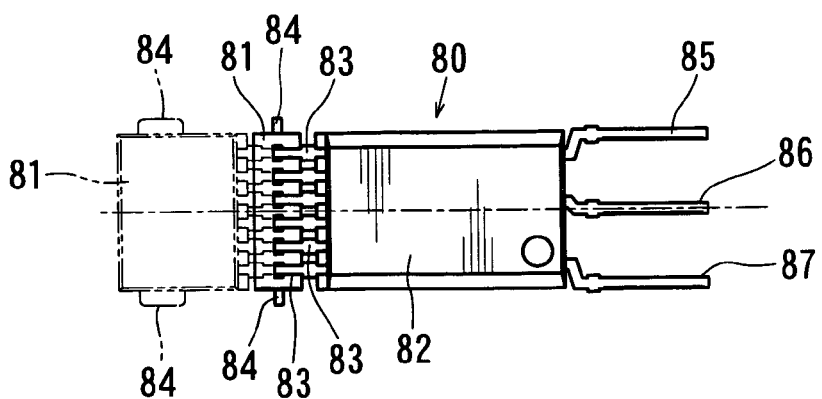
Figure 11:
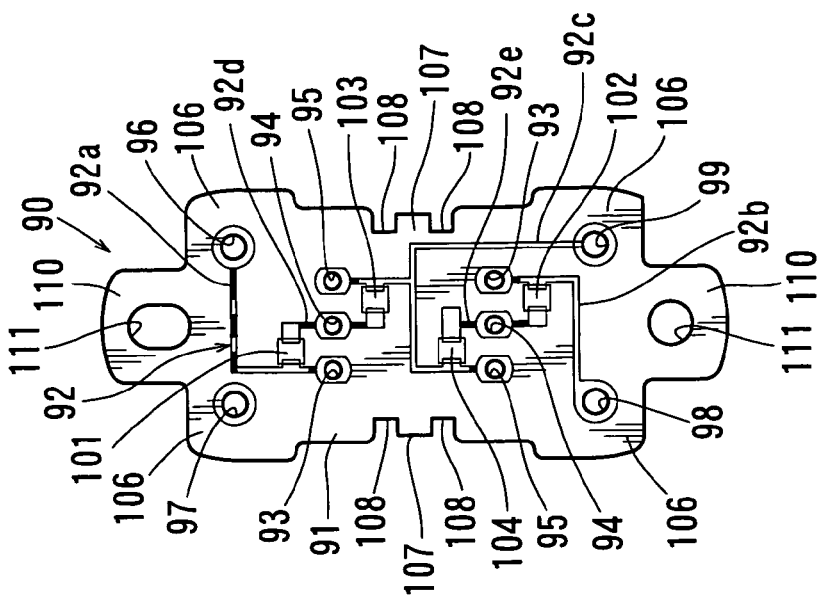
FIGS. 11(a), 11(b), and 11(c), are respectively, a front view, a side view, and a rear view of a printed circuit board, respectively.
Figure 11:
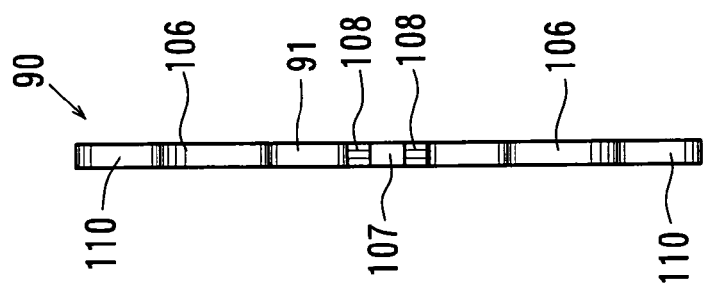
Figure 11:
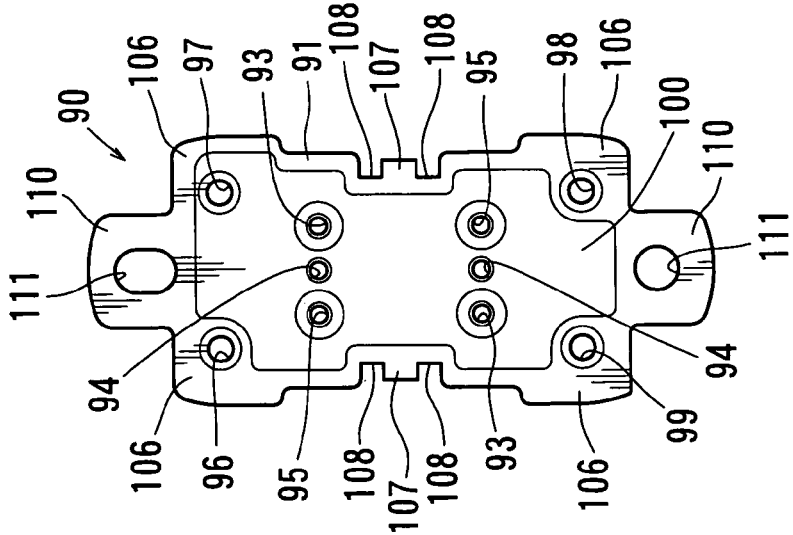

The sensor ICs, 80(1) and 80(2), will now be described with reference to FIGS. 10(*a*), 10(*b*), and 10(*c*). Because the sensor ICs 80(1) and 80(2) have the same configuration, only one of the sensor ICs is respectively shown in FIGS. 10(*a*), 10(*b*), and 10(*c*) in a perspective view, a side view, and a plan view. The representative sensor IC is denoted by the reference numeral 80. As shown in FIGS. 10(*a*) to 10(*c*), the representative sensor IC 80 has a computing section 82 in addition to the sensing section 81. The computing section 82 is disposed on the rear side (the right side as viewed in FIGS. 10(*a*) to 10(*c*)) of the sensing section 81. The computing section 82 has a substantially rectangular plate-like configuration. The sensing section 81 and the computing section 82 are mechanically and electrically connected to each other via a plurality of connecting terminals 83 (six connecting terminals 83 are provided in this representative embodiment).

The sensing section 81 has a casing made of resin, within which a magnetoresistive element is disposed. As shown in FIGS. 10(*b*) and 10(*c*), the connecting terminals 83 are bent to have substantially L-shaped configurations, so that the sensing section 81 is inclined relative to the computing section 82 by an angle of about 90° toward the rear side (upper side as viewed in FIG. 10(*b*). A pair of projections 84 made of metal extends from the right side and the left side (the upper and lower sides as viewed in FIG. 10(*c*)) of the casing of the sensing section 81 and are positioned symmetrically to each other. The projections 84 are clamped by a mold during the injection molding process of the sensor IC 80, in order to accurately fix the magnetoresistive element in a position relative to the mold. The projections 84 therefore serve as positioning members for locating the magnetoresistive element during the molding process.

The computing section 82 has connecting terminals 85, 86, and 87, that extend parallel to each other in a downward direction (the right direction as viewed in FIG. 10*c*). The connecting terminals 85, 86, and 87, respectively serve as an input terminal, an earth terminal and an output terminal. The sensing section 81 and the computing section 82 each has a width in the vertical direction as viewed in FIG. 10(*c*). The width is substantially equal to the distance between the right sidewall 61*a* and the left sidewall 61*b* (see FIG. 9(*e*)) of the rectangular tubular portion 61 of the holder 60.

Figure 7:
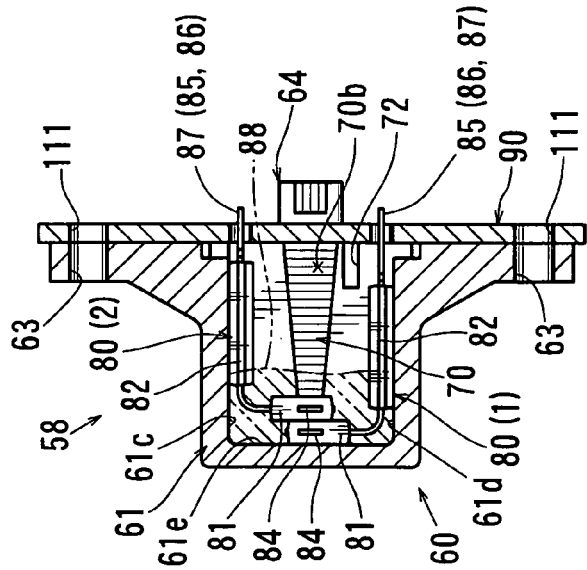
FIGS. 7(a), 7(b), and 7(c), are respectively, a front view, a side view, and a broken-away bottom view of a rotational angle sensor.
Figure 7:
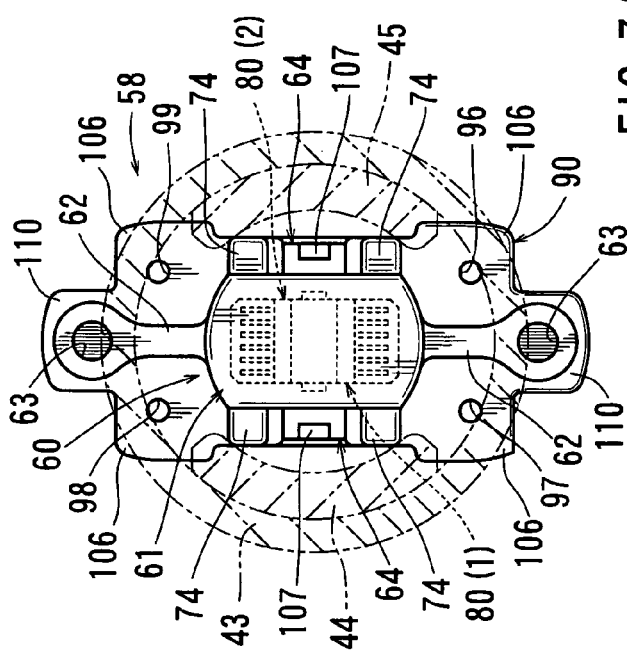
Figure 7:
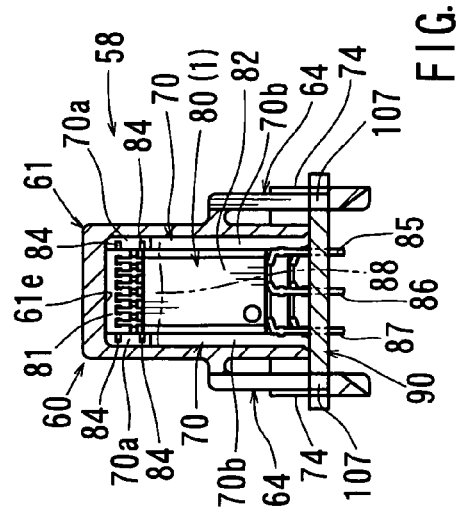

As shown in FIG. 7(*b*), the sensor ICs 80(1) and 80(2) are disposed within the rectangular tubular portion 61 of the holder 60. In order to position the sensing section 81 of the sensor IC 80(1) relative to the holder 60, the projections 84 of the sensor IC 80(1) are inserted into the right and left guide recesses 70 of the holder 60 via the tapered recess portions 70*b* (see FIG. 9(*b*)), so that the projections 84 slidably engage the positioning recess portions 70*a*. Eventually, the sensing section 81 of the sensor IC 80(1) contacts with the inner bottom surface 61*e* of the rectangular tubular portion 61 of the holder 60 in surface-to-surface contact relationship. At the same time, the computing section 82 contacts an inner sidewall surface 61*d* (the lower wall surface as viewed in FIG. 7(*b*)) of the rectangular tubular portion 61 of the holder 60 also in surface-to-surface contact relationship.

In order to position the sensing section 81 of the sensor IC 80(2) relative to the holder 60, the orientation of the sensor IC 80(2) is rotated 180° relative to the sensor IC 80(1). Then the projections 84 of the sensor IC 80(2) are inserted into the right and left guide recesses 70 of the holder 60 via the tapered recess portions 70*b* (see FIG. 9(*b*)), so that the projections 84 slidably engage the positioning recess portions 70*a*. Eventually, the sensing section 81 of the sensor IC 80(2) contacts with the sensing section 81 of the sensor IC 80(1) in surface-to-surface contact relationship. At the same time, the computing section 82 contacts an inner sidewall surface 61*c* (an upper wall surface as viewed in FIG. 7(*b*)) of the rectangular tubular portion 61 of the holder 60, also in surface-to-surface contact relationship. As a result, the center of the sensing section 81 of the sensor IC 80(1) and the center of the sensing section 81 of the sensor IC 80(2) are brought in alignment with each other. Further, the connecting terminals 85, 86, and 87, of the sensor IC 80(1) and the connecting terminals 85, 86, and 87, of the sensor IC 80(2) may be positioned to be symmetrical to each other about a point that corresponds to the center of the detecting sections 81. The center of the detecting sections 81 is preferably positioned on the central axis of the rectangular tubular portion 61.

Here, the connecting terminals 85, 86, and 87 of the second sensor IC 80(2) are cut so as to have a length shorter than the length of the connecting terminals 85, 86, and 87 of the sensor IC 80(1). The length of the connecting terminals 85, 86, and 87 of the second sensor IC 80(2) protruding from the holder 60 are adjusted so as to be substantially equal to the protruding length of the connecting terminals 85, 86, and 87 of the sensor IC 80(1) when the sensor ICs 80(1) and 80(2) have been assembled within the holder 60. Alternatively, the protruding length may be adjusted by bending the connecting terminals 85, 86, and 87 of the sensor IC 80(2) to have U-shaped or V-shaped configurations. Using the alternative arrangement, it is not necessary to cut the connecting terminals 85, 86, and 87. Of course, in some cases such adjustment of the protruding length may not be necessary.

As shown in FIG. 7(*b*), a potting resin 88 is potted into the rectangular tubular portion 61 of the holder 60 by using a suitable dispenser, after the sensor ICs 80(1) and 80(2) have been assembled into the rectangular tubular portion 61 as previously described. Therefore, the sensing sections 81 of the sensor ICs 80(1) and 80(2) are embedded in the potting resin 88. Preferably, the potting resin 88 may be chosen to have a good durability and softness so as to not be unduly deformed in order to protect the sensing sections 81 of the sensor IC 80(1) and 80(2) from thermal stress and vibrations. The potting resin 88 can help ensured that the detection accuracy of the sensing sections 81 may not be lowered during a long time period of use. In addition, because the potting resin 88 is potted with low pressure into the rectangular tubular portion 61 of the holder 60, possible distortion of the sensing sections 81 of the sensor IC 80(1) and 80(2) can be avoided thereby further ensuring the detection accuracy of the sensing sections 81. Conversely, in a situation where resin is filled into the rectangular tubular portion 61, for example by an insertion molding process, there is a possibility that the sensing sections 81 of the sensor ICs 80(1) and 80(2) may be distorted due to the injection pressure and heat of the resin. In the case of injected resin, the detection accuracy of the sensing sections 81 may be lowered.

The printed circuit board 90 will now be described with reference to FIGS. 11(a), 11(b), and 11(c), which respectively show a front view, a side view and a rear view of the printed circuit board 90. The printed circuit board 90 has a substantially rectangular plate-like substrate 91 and a wiring pattern 92 formed on one side of the substrate 91, as shown in FIG. 11(c). The substrate 90 is made of an electrically insulative material and the wiring pattern 92 is made of an electrically conductive material. For the purposes of explanation, one side (the side shown in FIG. 11c)) of the substrate 91 on which the wiring pattern 92 is formed will be hereinafter called the "rear side." The other side (the side shown in FIG. 11(a)) will be hereinafter called the "front side."

As shown in FIGS. 11(a) and 11(b), two sets of through holes 93, 94, and 95, are formed in the substantially central portion of the printed circuit board 90 and are arranged in upper and lower rows. In addition, the two set of through holes 93, 94, and 95 are arranged symmetrically about a central point of the printed circuit board 90. The two sets of through holes 93, 94, and 95 are adapted to be respectively connected to the sensor ICs 80(1) and 80(2). More specifically, the through holes 93, 94, and 95 are respectively used for the purposes of inputting, earth, and outputting. Four through holes 98, 97, 96, and 99 are also formed in the printed circuit 90 at four corner portions thereof and are adapted to be connected to external terminals as will be hereinafter described. More specifically, the through hole 98, 97, 96, and 99 are respectively used for the purposes of outputting (the V1 signal), earth, outputting (the V2 signal), and inputting. For the purposes of explanation, the through holes 93, 94, and 95 will be hereinafter called "IC-side through holes" and the through holes 98, 97, 96, and 99 will be hereinafter called "terminal connecting through holes."

As shown in FIG. 11(c), the IC-side through hole 93 for the outputting purpose in the upper side row and the terminal connecting through hole 96 for the output signal V1 are electrically connected to each other via the part 92a of the wiring pattern 92. On the other hand, the IC-side through hole 93 in the lower row and the terminal connecting through hole 98 for the output signal V2 are electrically connected to each other via the part 92b of the wiring pattern 92. The IC-side through holes 95 for the inputting purposes in the upper and lower rows and the terminal connecting through hole 99 for the inputting purposes are electrically connected to each other via the part 92c of the wiring pattern 92. The IC-side through holes 94 for the purpose of providing an earth in the upper and lower rows and the terminal connecting through hole 97 for the purpose of providing an earth are electrically connected to each other via a shield surface 100 formed on the front side of the printed circuit board 90 (see FIG. 11(a)). The shield surface 100 serves to shield possible electrical noises and interference and also serves as a common ground line for connecting the IC-side through holes 94 to the terminal connecting through hole 97. In addition, by utilizing the shield surface as a common ground line, sensor ICs having the same configuration can be used as either the sensor IC 80(1) or the sensor IC 80(2). As shown in FIG. 11(c), the part 92d of the wiring pattern 92 extends vertically across the IC-side through hole 94 in the upper row. Similarly, the part 92e of the wiring pattern 92 extends vertically across the IC-side through hole 94 in the lower row.

A first capacitor 101 is electrically connected between the parts 92a and 92d of the wiring pattern 92. Similarly, a second capacitor 102 is electrically connected between the parts 92b and 92e of the wiring pattern 92. A third capacitor 103 is electrically connected between the parts 92c and 92d. A fourth capacitor 104 is electrically connected between the parts 92c and 92e. In this way, the first to fourth capacitors 101 to 104 are mounted on the printed circuit board 90 in order to prevent the sensor ICs 80(1) and 80(2) from being charged with a high voltage that may be produced by static electricity. Although not shown in the drawings, a suitable coating may be provided on both the front and rear surfaces of the printed circuit board 90 in order to avoid or minimize the influence of moisture.

As shown in FIG. 11(a), lateral tabs 106 are formed on both upper and lower ends of each of the right and left sides of the printed circuit board 90. The lateral tabs 106 are positioned symmetrically with each other. In addition, engaging projections 107 extend from right and left sides in a middle position (as determined in the vertical direction) of the printed circuit board 90. The engaging projections 107 are configured to be symmetrical to each other. In addition, each of the engaging projections 107 is formed by providing a pair of engaging recesses 108 so that a recess 108 is formed on both sides of the engaging projection 107 in the vertical direction. The each engaging recess 108 of a pair is symmetrical to each other with respect to the corresponding engaging projection 107. Upper and lower tabs 110 extend from the upper and lower sides in a middle position (as determined in the horizontal direction) of the printed circuit board 90. A positioning hole 111 is formed in each of the upper and lower tabs 110. The positioning holes 111 of the upper and lower tabs 110 are positioned so as to align with the positioning holes 63 (see FIG. 9(b)) of the holder 60. Here, the positioning hole 111 of the upper tab 110 has a vertically elongated elliptical configuration while the positioning hole 111 of the lower tab 110 has a circular configuration.

Figure 12:
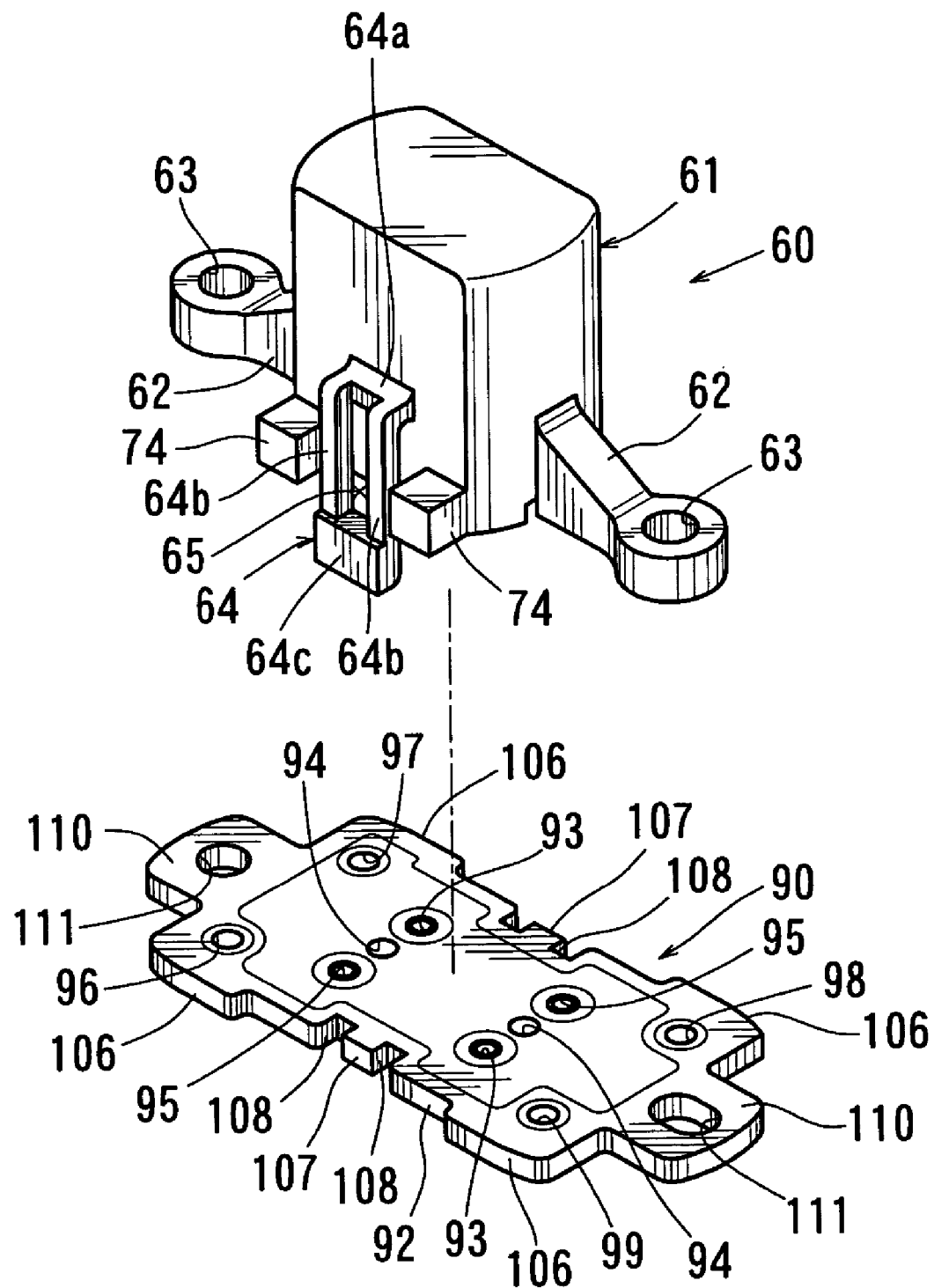
FIG. 12 is an exploded perspective view of the holder and the printed circuit board.

As shown in FIG. 12, the holder 60 and the printed circuit board 90 can be joined to each other in a snap-fit manner. Positioning the holder 60 and the printed circuit board 90 directly opposite to each other in the vertical direction and then moving them towards each other accomplishes the snap-fit assembly. More specifically, the engaging pieces 64 of the holder 60 engage with the engaging projections 107 of the printed circuit board 90 in a snap-fit manner as shown in FIG. 7(c). The engaging pieces 64 are resiliently deformed as indicated by dashed chain lines in FIG. 9(d).

The cooperation between the engaging pieces 64 and the engaging projections 107 during the assembly operation of the holder 60 to the printed circuit board 90 will now be described with reference to FIGS. 13(a), 13(b), 13(c), and 13(d), which are explanatory sectional views showing the assembly operation. First, as shown in FIG. 13(a), each of the engaging pieces 64 are positioned directly opposing and above the corresponding engaging projections 107. Then, each of the engaging pieces 64 is moved toward the corresponding engaging projection 107, so that engaging projection 107 enters between the guide projections 66 of the engaging piece 64. As a result, the engaging projection 107 is positioned relative to the engaging piece 64 with respect to the widthwise direction (a direction orthogonal to the plane of the sheet of FIG. 13(b)). At the same time, the guide surface 68 of the engaging piece 64 contacts with the end portion of the engaging projection 107.

As each of the engaging pieces 64 further moves toward the corresponding engaging projection 107, the end portion of the engaging projection 107 moves along the guide surface 68 toward the engaging hole 65, while the engaging projection 107 is resiliently deformed so as to be bent outward, as shown in FIG. 13(c).

As each of the engaging pieces 64 moves further towards the corresponding engaging projection 107, the engaging projection 107 moves over the joint 64c of the engaging piece 64. The engaging piece 64 then resiliently recovers toward its former configuration so that the engaging projection 107 interfaces with the engaging hole 65 of the engaging piece 64 as shown in FIG. 13(d). At the same time, the arms 64b of the engaging piece 64 interface with the engaging recesses 108 of the printed circuit board 90. In addition, the holder 60, in particular the rectangular tubular portion 61, contacts with the printed circuit board 90 in surface-to-surface contact relationship. The shifting movement prevention extensions 74 also contact the outer peripheral portions of the printed circuit board 90.

The assembly operation of the printed circuit board 90 with the holder 60 is completed. The printed circuit board 90 is now coupled to the holder 60 and the printed circuit board 90 is suitably positioned relative to the holder 60. In this assembled state, the positioning holes 63 of the holder 60 are aligned with the positioning holes 111 of the printed circuit board 90 as shown in FIG. 7(b). In addition, the center of the printed circuit board 90 may be approximately positioned in alignment with the center of the sensing sections 81 of the sensor ICs 80(1) and 80(2), i.e., the central axis of the rectangular tubular portion 61. Further, the connecting terminals 87, 86, and 85 of the sensor IC 80(1) are respectively inserted into the IC-side through holes 93, 94, and 95 of the lower row of the printed circuit board 90 (see FIG. 11(a)). The connecting terminals 87, 86, and 85 of the sensor IC 80(2) are respectively inserted into the IC-side through holes 93, 94, and 95 of the upper row of the printed circuit board 90. Thereafter, the IC-side through holes 93, 94, and 95 are electrically connected to the corresponding connecting terminals 87, 86, and 85 by a suitable means, preferably such as laser soldering.

By the processes described above, the rotational angle sensor 58 (see FIGS. 7(a) to 7(b)) can be assembled by coupling the printed circuit board 90 to the holder 60, where the holder 60 already has the sensor ICs 80(1) and 80(2) disposed therein. The rotational angle sensor 58 may then be mounted to the cover 30 by the following mounting process.

First, the rotational angle sensor 58 is moved relative to the cover 30 such that the positioning pins 56 of the cover 30 (see FIGS. 5 and 6) are inserted into the corresponding positioning holes 111 of the printed circuit board 90 and the corresponding positioning holes 63 of the holder 60 (see FIG. 7(b)). The printed circuit board 90 is then positioned so as to contact the support projections 54a, 54b, 54c, and 54d of the cover 30 (see FIGS. 5 and 6) in a surface-to-surface contact relationship. At the same time, the upper and lower tabs 110 of the printed circuit board 90 (see FIG. 11(b)) are positioned so as to contact the mounts 54 of the cover 30 (see FIGS. 5 and 6). In this configuration, end portions 56a (indicated by double dashed chain lines in FIG. 4) of the positioning pins 56 are heated and deformed by pressure so that the end portions 56a are formed into enlarged portions 56a1. The holder 60 and the printed circuit board 90 can then be prevented from being inadvertently removed from the cover 30 (see FIG. 4). Because the printed circuit board 90 is positioned to contact the mounts 54 and the support projections 54a to 54d of the cover 30 in surface-to-surface contact relationship, the rotational angle sensor 58 can be stably positioned relative to the cover 30.

Simultaneously with the above positioning step, the connecting ends 47b, 48b, 50b, and 51b of the terminals 47, 48, 50, and 51, integrated with the cover 30 by an insert molding process, are inserted into the corresponding through holes 98, 99, 96, and 97 formed in the printed circuit board 90 as shown in FIG. 4. The connecting ends 47b, 48b, 50b, and 51b are then electrically connected to the corresponding through holes 98, 99, 96, and 97 by a soldering process.

Subsequently, a potting resin 113 is potted into the recess 53 of the cover 30 as indicated by the double dashed chain lines in FIGS. 3 and 4. In particular, the potting resin 113 is potted into the holder 60 via the cut-out recesses 72 formed in the rectangular tubular portion 61 (see FIGS. 9(b) and 9(c)). The potting resin 113 is also filled into the bottom region of the recess 53. Therefore, the potting resin 113 covers the front and rear surfaces of the printed circuit board 90, the connecting ends 47b, 48b, 50b, and 51b of the terminals 47, 48, 50, and 51, the capacitors 101, 102, 103, and 104, and the connecting terminals 85, 86 and 87 of the sensor ICs 80(1) and 80(2). As a result, moisture may be prevented or inhibited from entering electrically conductive elements. Potential dew condensation or migration of moisture can be reliably prevented or minimized. The cut-out recesses 72 are eventually closed by the potting resin 113 so that the interior of the rectangular tubular portion 61 is sealed from the outside environment. The potting resin 113 may be chosen so as to have a good durability and softness and not likely to be unduly deformed in order to protect the capacitors 101, 102, 103, and 104, and the wiring pattern 92 from thermal stress and vibrations. Preferably, the potting resin 113 may be an epoxy resin. Although silicon-type UV curable resin also can be used as the potting resin 113, epoxy resin is more economical than silicon-type UV curable resin.

Preferably, the potting resin 113 may first be filled into the recess 53 of the cover 30 under a condition of a vacuum. The cover 30 may then be exposed to environmental pressure so that the potting resin 113 may be forced to flow into the rectangular tubular portion 61 via the cut-out recesses 72. As a result of the pressure variation, the potting resin 113 may smoothly flow into the rectangular tubular portion 61 via the cut-out recesses 72. Due to the smooth flowing of the potting resin 113, distortion of the sensing sections 81 of the sensor ICs 80(1) and 80(2) can be reliably avoided so that the detection accuracy of the sensing sections 81 may not be lowered due to distortion. Thus, if an insert molding process injects the potting resin 113, there is a possibility that the injection pressure will distort the sensing sections 81. If distorted, the result is that the detection accuracy of the sensing sections 81 may be lowered. By utilizing a controllable pressure difference in order to introduce the potting resin 113 into the holder 60 as previously described, the distortion of the sensing sections 81 is not likely.

The cover 30 having the rotational angle sensor 58 mounted thereon as previously described is then joined to the throttle body 1 as shown in FIG. 1. Joining to throttle body 1 completes the throttle control device. Simultaneous with the joining process of the cover 30 to the throttle body 1, the rectangular tubular portion 61 of the holder 60 may be positioned on the same central axis as the yoke 43, i.e., the rotational axis L of the throttle shaft 6. In addition, the rectangular tubular portion 61 may be positioned between the magnets 44 and 45 so as to be spaced from the magnets 44 and 45 by a predetermined distance. More specifically, the sensing sections 81 of the sensor ICs 80(1) and 80(2) may be positioned between the magnets 44 and 45 such that the opposing flat surfaces of the sensing sections 81, having substantially rectangular configurations, extend perpendicular to the rotational axis L of the throttle shaft 6. This allows the sensing sections 81 to be able to reliably detect the direction or orientation of the magnetic field (indicated by substantially parallel magnetic field lines) produced between the magnets 44 and 45.

The calculation section 82 of each of the sensor ICs 80(1) and 80(2) calculates the output signal from the magnetoresistive element disposed within the sensing section 81 in order to output a signal to the control device, i.e., ECU, representing the direction of the magnetic field. Because the magnets 44 and 45 produce parallel magnetic lines across the sensing sections 81, the direction of the magnetic field can be reliably detected. In other words, the detection of the direction of the magnetic field does not directly depend upon the strength of the magnetic field. In addition, because two sensor ICs 80(1) and 80(2) are incorporated in this representative embodiment, the detection of the direction of the magnetic field can be reliably performed. Even if one of the sensor ICs 80(1) and 80(2) accidentally fails, the other of the sensor ICs 80(1) and 80(2) can still determine the direction of the magnetic field. Thus, although two sensor ICs 80(1) and 80(2) are incorporated in this representative embodiment, one of these sensor ICs can be eliminated without losing the ability to determine the rotational angle of the throttle valve 12.

In operation, when the engine of the automobile is started, the motor 20 (see FIG. 1) may be driven under the control of the electronic control device, i.e., the ECU (not shown), so that the throttle valve 12 is rotated to open and close the intake air channel 4. The motor 20 rotates the throttle valve 12 via the reduction gear mechanism 29 and the throttle shaft 6. As a result, the motor 20 via the throttle valve 12 controls the flow rate of the intake air flowing through the intake air channel 4. The throttle gear 16, the yoke 43, and the magnets 44 and 45 rotate as the throttle shaft 6 is rotated. Therefore, in response to the rotation of the throttle shaft 6, the direction or orientation of the magnet field (indicated by the magnet field lines) across the sensor ICs 80(1) and 80(2) (see FIG. 4), of the rotational angle sensor 58, changes. The changing direction causes a change in the output signals from the sensor ICs 80(1) and 80(2). The output signals are communicated to the electronic control device. The electronic control device then calculates the rotational angle of the throttle shaft 6, i.e., the opening angle of the throttle valve 12, based upon the output signals.

The electronic control device then performs various control operations, such as a fuel injection control operations, an operation for correcting the opening angle of the throttle valve 12, a speed-change control of an automatic transmission. The various operations are performed based upon the signal representing the opening angle of the throttle valve 12, a driving speed signal from a vehicle speed sensor (not shown), a rotational speed signal from a crank angle sensor (not shown), a signal representing the amount of stepping of an accelerator pedal, a detection signal from an $O_2$ sensor, and a detection signal from an air flow meter, etc.

According to the rotational angle sensor 58 (see FIGS. 1 to 4) incorporated into the throttle control device of this representative embodiment, the sensor ICs 80(1) and 80(2) can be easily and accurately positioned in predetermined positions within the holder 60 by the positioning recess portions 70a of the guide recesses 70 formed in the holder 60. Therefore, any shifting movement of the sensor ICs 80(1) and 80(2) relative to the holder 60 can be reliably prevented or minimized.

According to another feature of the above representative embodiment the rotational angle sensor 58 has the two sensor ICs 80(1) and 80(2) that are the same as each other. The connecting terminals 85, 86, and 87 of the sensor IC 80(1) and the connecting terminals 85, 86, and 87 are arranged to be symmetrical with each other about a point. In addition, the noise shield surface 100 serving also as a ground line is formed on one side (front side) of the printed circuit board 90 opposite to the side (rear side) on which the wiring pattern 92 is formed. Therefore, the wiring pattern 92 can be formed on the rear side of the printed circuit board 90 without pattern parts that cross over other parts. As a result, it is possible to simplify the wiring operation on the rear side of the printed circuit board 90. For this reason, the manufacturing costs of the rotational angle sensor 58 can be reduced and the reliability of the rotational angle sensor 58 can be improved.

Further, the shield surface 100 serves as a ground line in addition to shielding electrical noises and/or interference produced by the motor in order to protect the sensor ICs 80(1) and 80(2) against these noises. This helps to further reduce the manufacturing costs of the rotational angle sensor 58.

According to another feature of the above representative embodiment, the positioning recess portions 70a of the guide recesses 70 formed in the holder 60 can be commonly used for determining the positions of the sensor ICs 80(1) and 80(2).

More specifically, because the projections 84 of the sensing sections 81 of the sensor ICs 80(1) and 80(2) are engaged with the positioning recess portions 70a, the sensing sections 81 can be reliably positioned relative to the holder 60.

In addition, because the guide recesses 70 include tapered recess portions 70b formed continuous with the positioning recess portions 70a and enlarged toward the open end of the holder 60, the projections 84 can be easily assembled into the positioning recess portions 70a even if the positions of the projections 84 have been shifted by a small amount relative to the positioning recess portions 70a prior to inserting the sensor ICs 80(1) and 80(2). In other words, a wide tolerance regarding the positions of the projections 84 relative to the holder 60 prior to the engaging operation is available. The tapered recess portions 70b may guide the projections 84 into the positioning recess portions 70a as the projections 84 move along the guide recesses 70. Consequently, the projections 84 can be easily positioned to engage the positioning recess portions 70a.

Further, according to this representative embodiment, the printed circuit board 90 can be coupled to the holder 60 by means of a snap-fit mechanism. The snap-fit mechanism includes engaging projections 107 formed on the printed circuit board 90 and the engaging pieces 64 of the holder 60 that can be resiliently deformed to engage the engaging projections 107 (see FIGS. 13(*a*) to 13(*d*)). Therefore, the printed circuit board 90 can be easily and reliably coupled to the holder 60. In addition, the engaging projections 107 are formed on the printed circuit board 90. The printed circuit board 90 may have a greater rigidity than the rigidity of the holder 60. The engaging pieces 64 are formed on the holder 60. The holder 60 may have a higher degree of freedom in design than the degree of freedom associated with the printed circuit board 90. Therefore, the engaging projections 107 and the engaging pieces 64 are suitably formed on the printed circuit board 90 and the holder 60, respectively.

The engaging projections 110 can be suitably positioned relative to the engaging pieces 64 (see FIG. 13(b)) because the guide projections 66 are formed on the engaging pieces 64. Therefore, the engaging projections 107 can be smoothly and suitably guided along the engaging pieces 64 for a snap-fit engagement.

Further, the engaging pieces 64 can be resiliently deformed as the engaging projections 107 move relative to and along the guide surfaces 68 (see FIG. 13(c)) because the guide surfaces 68 are formed on the engaging pieces 64. Therefore, the reaction forces from the engaging projections 107 can easily and resiliently deform the engaging pieces 64.

Furthermore, the shifting movement prevention extensions 74 are formed on the holder 60 for contacting the outer peripheral portion of the printed circuit board 90 when the printed circuit board 90 has been coupled to the holder 60 via the snap-fit mechanism (see FIG. 13(d)). Therefore, the printed circuit board 90 can be reliably held in position relative to the holder 60, minimizing or preventing rattling of the printed circuit board 90.

According this representative embodiment, the holder 60 can be positioned in a predetermined position relative to the cover 30 through the engagement of the positioning pins 56 with the positioning holes 63 and 111 (see FIG. 4). Therefore, the holder 60 can be precisely mounted to the cover 30, improving the detection accuracy of the rotational angle sensor 58 in this respect.

In addition, the sensing sections 81 of the sensor ICs 80(1) and 80(2) are resiliently held within the holder 60 by potting the potting resin 88 into the rectangular tubular portion 61 of the holder 60 while the sensor ICs 80(1) and 80(2) are disposed within the holder 60 (see FIGS. 7(b) and 7(c)). Therefore, the sensor ICs 80(1) and 80(2) may not be unduly influenced by the effects of moisture and may be reliably protected against possible external forces that may be applied to the sensor ICs 80(1) and 80(2) during transportation of the holder 60 assembly. This is particularly advantageous when the production of the sensor ICs 80 (1) and 80(2) and the assembly operation of the rotational angle sensor 58 to the cover 30 are performed at different production sites.

Further, as shown in FIG. 11(c), the first capacitor 101 is electrically connected between the parts 92a and 92d of the wiring pattern 92 of the printed circuit board 90. The second capacitor 102 is electrically connected between the parts 92b and 92e. The third capacitor 103 is electrically connected between the parts 92c and 92d. The fourth capacitor 104 is electrically connected between the parts 92c and 92e. Part 92c is electrically connected between the connecting terminals 85 for the purpose of providing input to the sensor ICs 80(1) and 80(2). The parts 92a and 92b are electrically connected to the terminals 87 for the purpose of allowing output from the sensor ICs 80(1) and 80(2). Therefore, the capacitors may protect the sensor ICs 80(1) and 80(2) from damage caused by possible static electricity.

Furthermore, the sensor ICs 80(1) and 80(2) having the same configuration are disposed within the holder 60 with the orientation of the sensing section 81 of the sensor IC 80(2) turned 180° relative to the orientation of the sensing section 81 of the sensor IC 80(1), as shown in FIG. 7(b). As shown in FIG. 11(c), this allows the wiring pattern 92 to have a simple configuration without parts that cross over other parts. The manufacturing costs of the printed circuit board 90 can therefore be lowered and the reliability of the printed circuit board 90 can be improved.

Furthermore, because the terminals 47, 48, 50, and 51 are integrated with the cover 30 through a resin molding process, the terminals 47, 48, 50, and 51 can be accurately positioned in predetermined positions relative to the cover 30, as shown in FIGS. 5 and 6.

As previously described, the sensor ICs 80(1) and 80(2) detect the direction of the magnetic field produced by the magnets 44 and 45 attached to the throttle shaft 6. The opening angle of the throttle valve 12 is calculated from the detection signals from the sensor ICs 80(1) and 80(2) (see FIGS. 3 and 4). Consequently, the open angle of the throttle valve 12 is determined based upon the direction of the magnetic field detected by the sensor ICs 80(1) and 80(2). The detected signals may not be unduly influenced by a change in the positions of the magnets 44 and 45 due to either a change in the position of the throttle shaft 6 or a change in the strength of the magnetic field due to temperature characteristics of the magnets 44 and 45. The change in the position of the throttle shaft 6 means the change of the position of the throttle shaft 6 relative to the sensor ICs 80(1) and 80(2). Such changes may be caused due to wide tolerances in assembling the throttle shaft 6, a difference in thermal expansion characteristics between the throttle body 1 and the cover 30, possible displacement of the throttle shaft 6 or the bearings 8 and 10 due to wear, and thermal expansion of the resin (throttle gear 16) that is molded with the magnets 44 and 45 via an insert molding process.

According to the representative embodiment, the sensor ICs 80(1) and 80(2) can still accurately detect the direction of the magnetic field, improving the detection accuracy of the opening angle of the throttle valve 12 relative to conventional devices. The representative embodiment is particularly advantageous in the case of a throttle body 1 made of resin that cannot be precisely molded or machined. The representative embodiment is also advantageous in the case where the throttle body 1 and the cover 30 are made of different materials from each other, such as the case where the throttle body 1 is made of metal and the cover 30 is made of resin.

The ring-shaped yoke 43 has the same central axis as the rotational axis L of the throttle shaft 6. The magnets 44 and 45 are mounted to the throttle gear 16 and are disposed inside of the ring-shaped yoke 43 that is made of magnetic material so that a magnetic circuit is produced by the magnets 44 and 45 and the yoke 43. In particular, the magnets are magnetized so as to produce parallel magnetic lines therebetween. The detection accuracy of the direction of the magnetic field by the sensor ICs 80(1) and 80(2) can therefore be further improved.

Furthermore, the orientation of the sensing section 81 of each of the ICs 80(1) and 80(2) is inclined relative to the computing section 82 by bending the connecting terminals 83 (see FIG. 7(b)). The bending causes the sensor ICs 80(1) and 80(2) to have relatively compact configurations. The compact configurations of the sensor ICs 80(1) and 80(2) allows the throttle control device to have a compact configuration.

Second Representative Embodiment

Figure 14C:
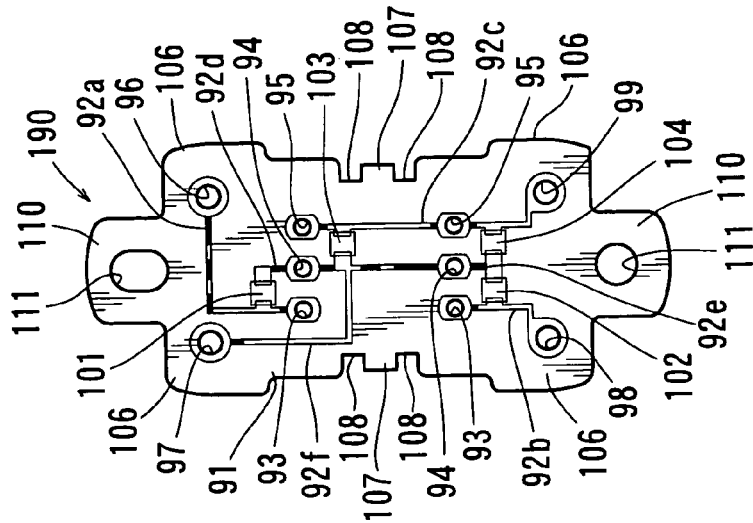
FIGS. 14(a), 14(b), and 14(c), respectively are a front view, a side view, and a rear view of a printed circuit board according to a second representative embodiment.
Figure 14B:
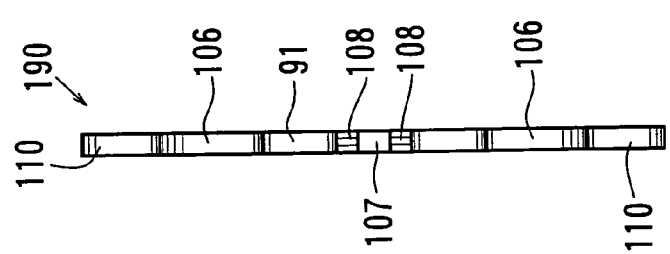
Figure 14A:
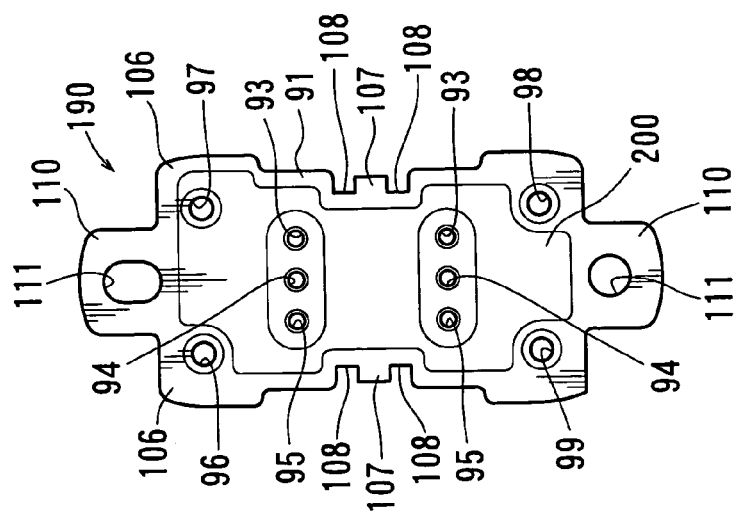

A second representative embodiment will now be described with reference to FIGS. 14(a), 14(b), and 14(c), and FIGS. 15(a), 15(b), and 15(c). The second representative embodiment is a modification of the first representative embodiment. Therefore, in FIGS. 14(a), 14(b), and 14(c), and FIGS. 15(a), 15(b), and 15(c), like members are given the same reference numerals as in the first representative embodiment and the explanation of these members may not be repeated. The second representative embodiment is different from the first representative embodiment in the construction of the printed circuit board. Referring to FIGS. 14(a), 14(b), and 14(c), a printed circuit board 190 of the second representative embodiment is configured as a single-layer one sided circuit board in which the arrangement of the IC-side through holes 93 (for outputting purposes) and the through hole 95 (for inputting purposes) in the lower row is inverted relative to the arrangement of the same through holes of the first representative embodiment. Thus, the IC-side through holes 93, 94, and 95 in the lower row are positioned symmetrically with the IC-side through holes 93, 94 and 95 in the upper row with respect to a central line of the printed circuit board 190. The central line extends in right and left directions (horizontally as viewed in FIG. 14(a)) and passes through the center of the printed circuit board 190.

As shown in FIG. 14(c), also in this representative embodiment the IC-side through hole 93 in the lower row is electrically connected to the terminal connecting through hole 98 via the part 92b of the wiring pattern 92. However, the path of the part 92b is different from the path of the part 92b of the wiring pattern 92 of the first representative embodiment. The IC-side through hole 93 in the upper row is electrically connected to the terminal connecting through hole 96 via the part 92a of the wiring pattern 92 in the same manner as in the first representative embodiment. Also, the IC-side through holes 95 in the upper and lower rows and the terminal connecting through hole 99 for the input signal Vc are electrically connected to each other via the part 92c of the wiring pattern 92, but via a different path from the path 92c of the first representative embodiment. The IC-side through holes 94 (for earthing (E2) purposes) in the upper and lower rows and the terminal connecting through hole 97 are electrically connected to each other via a part 92f that includes the part 92d and the part 92e. A shield surface 200 is formed on the front side of the printed circuit board 190 and is electrically connected to the through hole 99.

Also, similar to the first representative embodiment, the first capacitor 101 is electrically connected between the part 92a and 92d of the wiring pattern 92. The second capacitor 102 is electrically connected between the part 92b and 92e. The third capacitor 103 is electrically connected between the part 92c and 92d. The fourth capacitor 104 is electrically connected between the part 92c and 92e.

Figure 15:
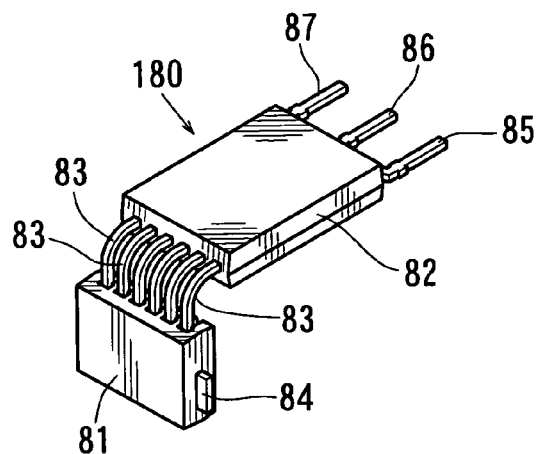
FIGS. 15(a), 15(b), and 15(c), respectively are a perspective view, a rear view, and a side view of one of the sensor ICs according to a second representative embodiment.
Figure 15:
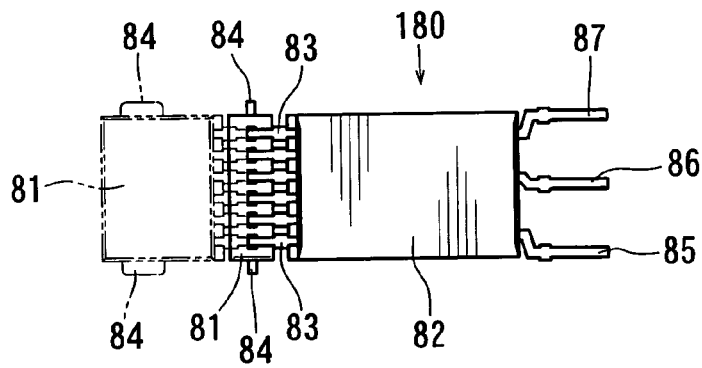
Figure 15:
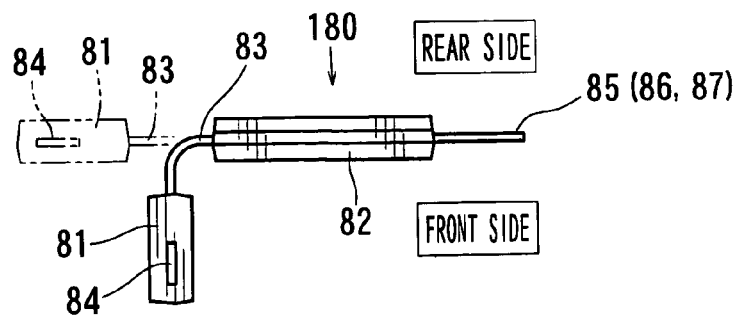

In order to cope with the configuration of the printed circuit board 190, a sensor IC 180 shown in FIGS. 15(a), 15(b), and 15(c) replaces the sensor IC 80(2) of the first representative embodiment. The sensor IC 180 is assembled into the holder 60 in the same manner as the sensor IC 80(2). Although the construction of the sensor IC 180 is basically the same as the sensor IC 80(2), the sensor IC 180 is different from the sensor IC 80(2) in that the sensing section 81 is inclined relative to the computing section 82 by an angle of about 90° in a direction towards the front side, i.e., a direction opposite to the inclined direction of the sensing section 81 of the sensor IC 80(2). In addition, in the assembled state within the holder 60, the connecting terminals 85, 86, and 87 of the sensor IC 80(1) are positioned symmetrically with the connecting terminals 85, 86, and 87 of the sensor IC 180 with respect to a central line passing through the center of the sensing sections 81, i.e., the central axis of the rectangular tubular portion 61.

In the same manner as with the printed circuit board 90 of the first representative embodiment, the printed circuit board 190 (see FIGS. 14(a) to 14(c)) is coupled to the holder 60 via a snap-fit mechanism after the sensor IC 80(1) and the sensor IC 180 have been assembled into the holder 60. At the same time, the connecting terminals 85, 86, and 87 of the sensor ICs 80(1) and 180 are inserted into the corresponding through holes 93, 94, and 95 of the printed circuit board 190. The connecting terminals 85, 86, and 87 of the sensor ICs 80(1) and 180 are then electrically connected to the corresponding through holes 93, 94, and 95 of the printed circuit board 190 by a suitable process, such as soldering. In other respects, the second representative embodiment is the same as the first representative embodiment.

The second representative embodiment is advantageous from an economical viewpoint because a single-layer one-side printed circuit board can be used as the printed circuit board 190. In addition, because the connecting terminals 85, 86, and 87 of the sensor IC 80(1) are positioned to be symmetrical with the connecting terminals 85, 86, and 87 of the sensor IC 180, it is possible to avoid cross-over wiring on the rear side of the printed circuit board 190. The wiring pattern 92 can then be simplified. In addition, the manufacturing costs of the rotational angle sensor 58 can be reduced and the reliability and the detection accuracy of the rotational angle sensor 58 can be improved.

(Possible Alternative Arrangements of First and Second Embodiments)

The present invention may not be limited to the above representative embodiments but may be modified in various ways. For example, although the sensor ICs 80 (180) are used as magnetic detection devices in the above representative embodiments, any other type of magnetic detection devices can be used as long as they can detect the strength of the magnetic field or the direction of the magnetic field produced between the magnets 44 and 45. For example, such magnetic detection devices may be magnetoresistive elements or any other type of magnetic detection elements, such as Hall elements, with or without computing sections connected thereto. Further, although the sensing section 81 and the computing section 82 are connected to each other via terminals in the above representative embodiment, they may be connected to each other via a lead wire or a printed circuit board. Furthermore, although the rotational angle sensor 58 is mounted on the cover 30, the rotational angle sensor 58 may be mounted on the throttle body 1 itself or any other members fixed in position relative to the throttle body 1. Furthermore, although the rotational angle sensor 58 of the above representative embodiments have been used for detecting the rotational angle of the throttle valve 12 of the throttle control device, the rotational angle sensor 58 may be used for detecting the rotational angle of any other rotary members.

The invention claimed is:

1. A rotational angle sensor for detecting a rotational angle of a rotary member based on a magnet field produced across the rotary member by a pair of magnets, comprising:
   a holder;
   at least one magnetic detection device disposed within the holder and arranged and constructed to detect the magnetic field and to output a signal representing the rotational angle of the rotary member,
   a printed circuit board coupled to the holder and electrically connected to the at least one magnetic detection device;
   a positioning device arranged and constructed to position the at least one magnetic detection device in a predetermine position relative to the holder, wherein the positioning device includes a plurality of projections formed on the at least one magnetic detection device and a plurality of positioning recesses formed in the holder for engaging the corresponding projections.

2. The rotational angle sensor as in claim 1, wherein the holder is adapted to be mounted to a fixed location.

3. The rotational angle sensor as in claim 1, wherein the at least one magnetic detection device has a sensing section for detecting the magnetic field, and wherein the projections are formed on the sensing section.

4. A rotational angle sensor for detecting a rotational angle of a rotary member based on a magnet field produced across the rotary member by a pair of magnets, comprising:
a holder;
at least one magnetic detection device disposed within the holder and arranged and constructed to detect the magnetic field and to output a signal representing the rotational angle of the rotary member,
a printed circuit board coupled to the holder and electrically connected to the at least one magnetic detection device;
a positioning device arranged and constructed to position the at least one magnetic detection device in a predetermine position relative to the holder,
wherein the at least one magnetic detection device has a sensing section for detecting the magnetic field, and
wherein the positioning device includes a projection formed on the sensing section and a corresponding positioning recess formed in the holder to engaging the projection.

5. The rotational angle sensor as in claim 4, wherein:
the holder has a rectangular tubular portion comprising
a central axis,
a closed first end,
an open second end,
the positioning recess is formed in an inner wall of the rectangular tubular portion,
the positioning device further includes a tapered recess formed in continuity with the positioning recess and opening at the open second end of the rectangular tubular portion; and
the tapered recess has a width gradually increasing toward the open second end of the rectangular tubular portion.

6. The rotational angle sensor as in claim 5, wherein two projections are formed on the sensing section on opposite sides of the sensing section, and
wherein two corresponding positioning recesses connected to the tapered recesses are formed on opposite sides of the inner wall of the rectangular tubular portion.

7. The rotational angle sensor as in claim 5, wherein the positioning device further includes pouring a resin into the holder,
wherein the sensing section of the at least one magnetic detection device is subsequently embedded in the resin material.

8. The rotational angle sensor as in claim 7, wherein the resin, before curing, is potted into the holder without applying substantial pressure to the resin.

9. The rotational angle sensor as in claim 1, wherein the printed circuit board includes a wiring pattern formed on one side of the printed circuit board, and
wherein the printed circuit board includes a ground line formed on the other side of the printed circuit board.

10. A rotational angle sensor for detecting a rotational angle of a rotary member based on a magnet field produced across the rotary member by a pair of magnets, comprising:
a holder;
at least one magnetic detection device disposed within the holder and arranged and constructed to detect the magnetic field and to output a signal representing the rotational angle of the rotary member,
a printed circuit board coupled to the holder and electrically connected to the at least one magnetic detection device;
a positioning device arranged and constructed to position the at least one magnetic detection device in a predetermine position relative to the holder
wherein the rotational angle sensor includes a first magnetic detection device and a second magnetic detection device each having a plurality of connecting terminals and positioned by the positioning device,
wherein the connecting terminals of the first magnetic detection device are positioned symmetrically to the connecting terminals of the second magnetic detection device about a point,
wherein the holder has a rectangular tubular portion having a central axis, and
wherein the point is positioned on the central axis of the rectangular tubular portion.

11. The rotational angle sensor as in claim 10, wherein the printed circuit board has a first group of through holes for connecting with the corresponding connecting terminals of the first magnetic detection device and a second group of through holes for connecting with the corresponding connecting terminals of the second magnetic detection device, and
wherein the first group of through holes is arranged symmetrically to the second group of through holes about the same point as the connecting terminals.

12. A rotational angle sensor for detecting a rotational angle of a rotary member based on a magnet field produced across the rotary member by a pair of magnets, comprising:
a holder;
at least one magnetic detection device disposed within the holder and arranged and constructed to detect the magnetic field and to output a signal representing the rotational angle of the rotary member,
a printed circuit board coupled to the holder and electrically connected to the at least one magnetic detection device;
a positioning device arranged and constructed to position the at least one magnetic detection device in a predetermine position relative to the holder,
wherein the rotational angle sensor includes a first magnetic detection device and a second magnetic detection device each having a plurality of connecting terminals and positioned by the positioning device,
wherein the connecting terminals of the first magnetic detection device are positioned symmetrically to the connecting terminals of the second magnetic detection device about a line,
wherein the holder has a rectangular tubular portion having a central axis, and
wherein the line passes through the central axis of the rectangular tubular portion.

13. The rotational angle sensor as in claim 12, wherein the printed circuit board has a first group of through holes for connecting with the corresponding connecting terminals of the first magnetic detection device and a second group of through holes for connecting with the corresponding connecting terminals of the second magnetic detection device, and wherein the first group of through holes is arranged symmetrically to the second group of through holes about the same line as the connecting terminals.

14. The rotational angle sensor as in claim 9, wherein the ground line serves as a shield for protecting the at least one detection device against a possible electrical noise and interference.

15. A rotational angle sensor for detecting a rotational angle of a rotary member based upon a magnet field produced across the rotary member by a pair of magnets, comprising:

a holder;

a first magnetic detection device and a second magnetic detection device disposed within the holder and arranged and constructed to detect the magnetic field and to output signals representing the rotational angle of the rotary member, wherein each of the first and second magnetic detection devices includes a plurality of connecting terminals; and a printed circuit board coupled to the holder and electrically connected to the connecting terminals of the first and second magnetic detection devices; and wherein the connecting terminals of the first magnetic detection device are positioned symmetrically to the connecting terminals of the second magnetic detection device, wherein the printed circuit board has a first group of connecting portions for connecting with the corresponding connecting terminals of the first magnetic detection device and a second group of connecting portions for connecting with the corresponding connecting terminals of the second magnetic detection device, and wherein the first group of connecting portions is arranged in a first row, and the second group of connecting portions is arranged in a second row, and wherein the first row and the second row are substantially parallel to each other.

16. The rotational angle sensor as in claim 15, wherein the printed circuit board includes a wiring pattern formed on one side of the printed circuit board, and wherein the printed circuit board includes a ground line formed on the other side of the printed circuit board.

17. The rotational angle sensor as in claim 16, wherein:

the first magnetic detection device and the second magnetic detection device have the same configuration as each other; and the connecting terminals of the first magnetic detection device are positioned symmetrically to the connecting terminals of the second magnetic detection device about a point.

18. The rotational angle sensor as in claim 17, wherein the holder has a rectangular tubular portion having a central axis, and wherein the point is positioned on the central axis of the rectangular tubular portion.

19. The rotational angle sensor as in claim 17, wherein the first group of connecting portions comprise a first group of through holes, and wherein the second group of connecting portions comprise a second group of through holes, and wherein the first group of through holes is arranged symmetrically to the second group of through holes about the same point as the connecting terminals.

20. The rotational angle sensor as in claim 17, wherein the connecting terminals of the first magnetic detection device are positioned symmetrically to the connecting terminals of the second magnetic detection device about a line.

21. The rotational angle sensor as in claim 20, wherein the holder has a rectangular tubular portion having a central axis, and wherein the line passes through the central axis of the rectangular tubular portion.

22. The rotational angle sensor as in claim 20, wherein, the first group of connecting portions comprise a first group of through holes, and wherein the second group of connecting portions comprise a second group of through holes, and wherein the first group of through holes is arranged symmetrically to the second group of through holes about the same line as the connecting terminals.

23. The rotational angle sensor as in claim 16, wherein the ground line serves as a shield for protecting the at least one detection device against a possible electrical interference.

* * * * *